(12) United States Patent
Höglund et al.

(10) Patent No.: US 8,161,997 B2
(45) Date of Patent: Apr. 24, 2012

(54) MULTIPURPOSE FLOW MODULE

(75) Inventors: Kasper Höglund, Rönninge (SE);
Tommy Noren, Veberöd (SE); Barry Johnson, Milton Keynes (GB); Erik Cardelius, Djursholm (SE)

(73) Assignee: Alfa Laval Corporate AB, Lund (SE)

( * ) Notice: Subject to any disclaimer, the term of this patent is extended or adjusted under 35 U.S.C. 154(b) by 973 days.

(21) Appl. No.: 12/091,260

(22) PCT Filed: Oct. 18, 2006

(86) PCT No.: PCT/SE2006/001186
§ 371 (c)(1),
(2), (4) Date: Jun. 25, 2008

(87) PCT Pub. No.: WO2007/050013
PCT Pub. Date: May 3, 2007

(65) Prior Publication Data
US 2008/0267845 A1    Oct. 30, 2008

(30) Foreign Application Priority Data

Oct. 24, 2005  (SE) ...................................... 0502355
Oct. 24, 2005  (SE) ........................... ITS/SE05/00610

(51) Int. Cl.
*F16K 49/00*   (2006.01)
*B01J 10/00*   (2006.01)
*B01J 19/00*   (2006.01)

(52) U.S. Cl. ........ 137/334; 422/402; 422/602; 422/603; 165/148

(58) Field of Classification Search ................ 422/402, 422/602, 603; 137/334; 165/148
See application file for complete search history.

(56) References Cited

U.S. PATENT DOCUMENTS

| | | | |
|---|---|---|---|
| 5,811,062 A * | 9/1998 | Wegeng et al. ............... 422/129 |
| 6,736,201 B2 * | 5/2004 | Watton et al. ................. 165/166 |
| 6,759,013 B2 * | 7/2004 | Kaltenbach et al. .......... 422/504 |
| 7,858,829 B2 * | 12/2010 | Hubel et al. ................... 568/620 |
| 2002/0045265 A1 * | 4/2002 | Bergh et al. ..................... 436/37 |
| 2005/0056713 A1 * | 3/2005 | Tisone et al. ................... 239/690 |
| 2005/0245628 A1 * | 11/2005 | Hubel et al. ................... 521/137 |

FOREIGN PATENT DOCUMENTS

| | | |
|---|---|---|
| EP | 0754492 A2 | 1/1997 |
| EP | 1123735 A2 | 8/2001 |
| EP | 0701474 B1 | 10/2004 |
| WO | WO0242704 A1 | 5/2002 |
| WO | WO03/082460 A1 | 10/2003 |
| WO | WO2004/089533 A1 | 10/2004 |

* cited by examiner

*Primary Examiner* — Walter D Griffin
*Assistant Examiner* — Huy-Tram Nguyen
(74) *Attorney, Agent, or Firm* — Michaud-Kinney Group LLP

(57) ABSTRACT

The present invention relates to a multipurpose flow module comprising flow plates and/or heat exchanger plates stacked together, which flow plate having a flow channel and one or more connection ports. To each flow plate or heat exchanger plate one or more barrier plates may be attached. The present invention further relates to a method for extraction, for reaction, for mixing, or combinations thereof in the multipurpose flow module, and to uses of the multipurpose flow module.

40 Claims, 17 Drawing Sheets

MULTIPURPOSE FLOW MODULE

FIELD OF THE INVENTION

The present invention relates to a multipurpose flow module, a method for extraction, for reaction, for separation, for mixing, or combinations thereof in a multipurpose flow module, and use of the multipurpose flow module.

BACKGROUND OF INVENTION

Examples of continuous chemical reactors, which have a continuous flow of materials or reactants into the reactor and a continuous flow of materials or products out of the reactor, are disclosed by WO 2004/089533, WO 03/082460, EP 1123735, and EP 0701474 B1. There are different features, which are important for flow modules, such as flexibility in set-up, flow configuration, mixing properties, temperature control, monitoring, residence times etc.

Therefore, a number of problems to overcome when designing and building multipurpose flow modules are for example, but are not limited to, leakage, enabling of visual inspection, cleaning of flow paths, adaptation of process flow path to get desired residence time for a given flow rate, access to process flow in the middle of the reactor, configuration of heat transfer flow, discharge of dissolved gas out of the module, mixing of fluids etc.

Thus, one object of the present invention is to provide a flexible concept of a multipurpose flow module, adaptive to a desired process.

Another object is to provide a multipurpose flow module, which has good accessibility and is easy to handle, etc.

A further object is to provide a multipurpose flow module having good heat transfer performance, and opportunity to control temperature.

A further object is to provide a multipurpose flow module having fluid flow characteristics suitable for chemical reactions, extractions, separations etc.

SUMMARY

The present invention resides in one aspect in a flat-designed multipurpose flow module that include smaller, stackable and externally or internally connectable or "two-dimensional" sections. Each section may be opened to reveal a flow path, a channel, a groove or a passage for one or more fluids, hereinafter called flow channels, which flow channels may be any suitable pattern or a densely packed pattern in a flow plate. Thus the present invention provides an adaptive or flexible multipurpose flow module of stackable and externally or internally connectable sections having a flow channel for the continuous flow of materials into the module and a continuous flow of materials or products out of the module. The multipurpose flow module can be stackable both horizontal as well as vertically.

Thus, the present invention relates to a multipurpose flow module comprising flow plates and/or heat exchanger plates stacked together, which flow plate having a flow channel and one or more connection ports. To each flow plate or heat exchanger plate one or more barrier plates may be attached. The present invention further relates to a method for extraction, for reaction, for mixing, or combinations thereof in the multipurpose flow module, and to uses of the multipurpose flow module.

Each section of the multipurpose flow module may comprise a flow plate having a flow channel for process fluid materials, and one or more barrier plates or one or more end plates. There may be one or more heat exchanger plates arranged to one or more of the flow plates, or between at least two flow plates separating the at least two plates. The sections may have their flow channels connected in series or parallel to each other.

According to an embodiment of the invention a flow module may comprise flow plates, barrier plates, end-plates, pressure plates, and eventually gaskets forming a flow-section. One or more of the flow sections may be arrange that the flow channels may be connected in a series or parallel to each other. Thus, the multipurpose flow module comprises at least one flow-section and optionally may one or more heat exchanger sections be attached to any of the flow sections. The heat exchanger section may comprise a heat exchanger plate, and one or more barrier plates, or end plates attached together. The flow sections and/or the heat exchanger section may be attached by external means or by internal means.

According to another embodiment of the present invention the multipurpose flow module may comprise at least one integrated flow section, which is a separate section. The integrated flow section comprises a flow plate and heat-exchanger plate manufactured as one piece having a flow channel on the flow plate side of the one piece and a heat exchanger zone on the heat exchanger plate side. The flow channel has one inlet and one outlet connected to the ends of the channel. One or more connection ports are arranged along at least one outer side of the integrated flow section communicating with the flow channel. A gasket and a plate are placed on the flow plate side for sealing the flow channel. An inserted element according to one alternative and a plate are placed on the heat exchanger plate side to seal the heat exchanger zone of the flow section. The flow channel of the integrated flow section has one or more mixing zones in the form of bends or curved zones. According to one alternative the mixing zones are in the form of corners at the bends or the curved zones of the flow channel.

According to another alternative embodiment of the invention a flow section or an integrated flow section may comprise a flow plate, one or more barrier plates, gaskets, end plates, and one or more heat exchanger plates, and each flow section may be connected to another flow section or another integrated flow section and stacked together, having their flow channels connected in series or parallel to each other. Thus, the multipurpose flow module comprises one or more sections attached together by external means or by internal means.

According to another alternative embodiment of the invention the multipurpose flow module may comprise a larger number of sections of flow plates, barrier plates, and/or gaskets than the number of sections having one or more heat exchanger plates, wherein each section may be attached to another section, and stacked together, having their flow channels connected in series or parallel to each other. Thus, the multipurpose flow module comprises one or more sections of flow plates and one or more heat exchanger plate sections attached together by external means or by internal means.

According to another alternative embodiment of the invention the multipurpose flow module may comprise a smaller number of sections of flow plates, barrier plates, end plates, and eventually gaskets than the number of sections having one or more heat exchanger plates, wherein each section may be connected to another section and stacked together, having their flow channels connected in a series or parallel to each other. Thus, the multipurpose flow module comprises one or more flow sections, and two or more heat exchanger plate sections attached together by external means or by internal means.

According to another alternative embodiment of the invention the multipurpose flow module may comprise the same number of sections of flow sections as the number of heat exchanger sections. Each section may be attached to another section, and stacked together, having their flow channels connected in series or parallel to each other and attached together by external means or by internal means.

The flow plate of the invention may comprise a flow channel for fluid materials, and the flow channel may be cut through, may be carved in, may be grooved in, may be depressed in, may be etched in, or combinations of the defined techniques in the flow plate. The flow channel may constitute a two-dimensional pattern in the flow plate. The flow channel may be extended as long as possible in a dense pattern, as short as possible, or have any suitable length in the flow plate depending on the desired residence time, flow rate, reaction time etc. The length of the flow channel may be optimised and designed to suit the desired process. The shape of the flow channel pattern may be, for example, a labyrinth, a zigzag, winding channel or any other suitable shape. An inlet and an outlet can be connected to each end of the flow channel in each flow plate. The multi purpose flow module may be built of plates with differently sized flow channels on different plates. The length of the flow channels may be different, the channels may be long or short. The channels may also vary in width between the plates. One plate may have a wide channel and another may have a thinner channel depending on the application etc.

The flow channels may have a cross-sectional area of at least about $0.1$ $mm^2$. According to one alternative embodiment the cross-sectional area may be at least about $0.5$ $mm^2$. According to another alternative embodiment the cross-sectional area may be at least about $1$ $mm^2$. The cross-sectional area may be as large as about $1000$ $mm^2$, or as large as about $10,000$ $mm^2$, but any size suitable for the desired process is applicable. According to one alternative embodiment the cross-sectional area of the flow channel may be within the range of from about $0.5$ $mm^2$ to about $100$ $mm^2$. According to another alternative embodiment the cross-sectional area of the flow channel may be within the range of from about $1$ $mm^2$ to about $75$ $mm^2$.

Along the outer sides of the flow plate one or more connection ports may be arranged between the outer side of the flow plate and the flow channel on at least one side, on two sides, on three sides, or on all four sides of the flow plate. To the connections ports any type of functions may be connected, it could be for instance inlets for reactants, inlets for other or additional fluids, inlets for any other media needed for desired process, outlets for process fluids, outlets for intermediate products to be fed into the flow channel at a later stage, outlets for test samples of process fluids from the flow channel, outlets for samples to be analysed continuously online or by batch samples by means of ultraviolet light (UV) spectrometers, infrared light (IR) spectrometers, gas chromatography, mass spectrometers (MS), nuclear magnetic resonance NMR, etc. to identify the intermediate products or substances and to control the process performance according to "Process-Analytic-Technology" (PAT). The connection ports may harbour any type of sensor units, thermo elements, etc. in contact with the flow channel to send information to a computer or to a controlling device. The connection ports may also be plugged when not used, if there is no need for a special function connected to the flow channel, or the connection ports may be equipped with security devices for pressure release, instant or controlled. According to one alternative of the invention one or more of the connection ports may be injection ports or dispersion ports.

The material of the flow plate may be selected from any corrosion resistant material. The material may be stainless steel, iron-based alloys, nickel-based alloys, titanium, titanium alloys, tantalum, tantalum alloys, molybdenum-base alloys, zirconium, zirconium alloys, glass, quartz, graphite, reinforced graphite, PEEK, PP, PTFE etc. or may the material of the flow section be a soft material such as soft PEEK, PP, PTFE etc. or Viton®, Teflon®, Kalrez® etc., and thus may the gaskets be eliminated in the multipurpose flow module.

According to one alternative embodiment a pressure plate may have a pattern corresponding to the flow channel, covering the flow channel, and acting on the gasket to seal the flow plate.

According to another alternative embodiment of the invention protruded zones along the circumferences of the flow channel may be arranged, on each side next to the flow channel, to enable a gasket to close the flow plate against an end plate or against a barrier plate, or a heat exchanger plate to prevent leakage.

A gasket may close or seal the flow plate from leaking, and the gasket can be arranged to cover or close the flow channel against an end plate, against a barrier plate, an insulator or against a heat exchanger plate.

The gasket may be of a softer material than that of the flow plate. Thus, the protrusions, along the flow channel, or the pressure plate enable a sufficient contact pressure to seal the flow plate against an end plate, a barrier plate, another flow plate, or against a heat exchanger plate.

The gasket may be a flat sheet, or multi layer sheet of a suitable material, example of such material may be multi layer expanded polytetrafluoroethylene (ePTFE), polytetrafluoroethylene (PTFE), perfluorelastomers, or fluorelastomers, polyetheretherketone (PEEK), polypropene (PP), etc. The material of the gasket may be a soft material such as soft PEEK, PP, PTFE etc. or Viton®, Teflon®, Kalrez® etc. or the gasket could be metallic O-rings or sealing elements of a suitable metallic material. The material of the gasket should have good chemical resistance depending on the process, but if the process does not need good chemical resistance then other materials are sufficient. The gasket material may be soft, until the clamping forces close the structure, and the material may be deformable with very small lateral dilatation. Thus, the gasket may fill out any imperfections in the sealing surfaces. According to one alternative embodiment the gasket may be shaped to correspond to the flow channels, formed by for example a printing tool, or the gasket may be compressed by external force to the desired shape to minimise gasket bulge down in the flow channel, resulting in that the cross section remains the same, and absorption of fluid in the gasket is reduced.

A membrane may be added between the sealing surfaces as one alternative. The multipurpose flow may comprise that at least one barrier plate or at least one gasket being a membrane according to one alternative of the invention. According to another alternative may a catalyst be added to the surface of the gasket or to the flow channel.

The barrier plates may have heat conductivity to enable heat transfer to or from the flow plate or the flow plates, or the barrier plate may be an insulator, and thus insulate the flow plate. The barrier plate may be on one side of the gasket, which barrier plate may have heat conductivity to enable heat transfer through the gasket from, for example, a neighbouring heat exchanger plate, a neighbouring flow plate or both to the flow plate on the other side of the gasket, or the barrier plate may be an insulator, and insulate the flow plate and the gasket from other heat transfer sources.

The barrier plates physically separate process fluids of the flow plate from the heat transfer fluid of the heat exchanger plate, process fluid from another flow plate, or both. Barrier plates may be integrated or permanently attached to flow plates, heat exchanger plates, or both for example by brazing, welding, bonding, or combinations thereof.

According to one alternative embodiment of the invention barrier plates may seal or close both sides of a flow plate, both sides of a heat exchanger plate, or both.

The barrier plates may be of any corrosion resistant material such as, but not limited to metal, plastic, polymer material, ceramic, glass, etc. The barrier plates or cover plates may be selected from suitable materials, such as, but not limited to stainless steel, iron-based alloys, nickel-based alloys, titanium, titanium alloys, tantalum, tantalum alloys, zirconium, zirconium alloys, molybdenum-base alloys, any corrosion resistant alloy, glass, quartz, graphite, reinforced graphite, PEEK, PP, PTFE etc.

The heat exchanger plate may be a non-fluid heat transfer plate, may be a Peltier element, may have depressions, channels or grooves in the plate, may have a cut through area covering the area of the flow channel of the flow plate, or may have cut through channels.

Each channel, depression, channel, groove or cut through area may have fins, wings, structured package material, metallic foams, etc. to increase heat transfer area, and to enhance turbulence of the heat exchanger fluid to improve the heat transfer according to one alternative embodiment of the invention.

The heat exchanger plate may be integrated or permanently attached to the barrier plate of the flow plate by brazing, welding, bonding, or combinations thereof, according to one alternative embodiment of the invention. According to another alternative embodiment each heat exchanger plate may have barrier plates, cover plates, or one barrier plate and one cover plate on each side of the heat exchanger plate, which plates may be permanently attached to the heat exchanger plate by brazing, welding, bonding, or combinations thereof.

According to one alternative embodiment of the invention the heat exchanger plate may be permanently attached to barrier plates on each side of the heat exchanger plate.

The heat exchanger plates may be made of any corrosion resistant material, and may be of stainless steel, iron-based alloys, nickel-based alloys, titanium, titanium alloys, tantalum, tantalum alloys, molybdenum-base alloys, zirconium, zirconium alloys, glass, quartz, graphite, reinforced graphite, PEEK, PP, PTFE etc.

According to one alternative embodiment of the invention an inlet and an outlet may be connected to each end of the heat exchanger plate. According to another alternative embodiment the inlet or the outlet may enclose sensors or thermo elements.

According to one alternative embodiment the heat exchanger plate, may have cut through channels, depressions, channels, or grooves, be inserted into an inlet tube, an outlet tube, or both on opposite sides of the heat exchanger plate. The inlet tube, the outlet tube, or both have inserted sensors, inserted thermo elements, or both for monitoring the process, for producing signals to be analysed in for example a computer or the like apparatus, or both.

The flow plates, the heat exchanger plates, the barrier plates, the cover plates and the endplates may be of the same material or may be of different materials, and the material or the materials may be selected from any corrosion resistant material or may be, but are not limited to, metal, glass, ceramics, graphite, reinforced graphite, polymer, plastic, etc.

According to one alternative embodiment may the material or the materials be selected from stainless steel, iron-based alloys, nickel-based alloys, titanium, titanium alloys, tantalum, tantalum alloys, molybdenum-base alloys, zirconium, zirconium alloys, glass, quartz, graphite, reinforced graphite, PEEK, PP, PTFE etc., or combinations thereof.

When the material in the multipurpose flow modules is of metal or of an alloy then parts of the module may be welded, brazed, bonded or combinations thereof to each other. If the parts are brazed then the brazing material may be selected from iron-based brazing material, nickel-based brazing material, copper-based brazing material or any other suitable material similar to the material in the multipurpose flow module.

Here the multipurpose flow module may be regulated and/or controlled by the aid of thermo elements, electrodes, different sensors adapted to produce different process signals corresponding to suitable properties of the desired fluids or process, or combinations thereof. The process signals may be evaluated by aid of a computer or any other means of evaluation to produce control signals, which may automatically control the applied process, the chemical reaction or to optimise flow rates, temperature, gas release, injections, pressures, dispersions, etc. or combinations thereof, and thus optimise the desired process and production of products from the multipurpose flow module.

It is preferable that the couplings between outlets and inlets of the flow plates, or between outlets and inlets of the heat exchanger plates be tight and secure so that leakage is not an issue. There are several different types of couplings on the market, which may be sufficient. According to one embodiment of the invention the coupling may be a dividable clamp coupling, which comprises two halves and two screws. The diameter and the depth of the dividable clamp coupling may be slightly larger than the outer diameter of the liner. The clamp may be made as two identical halves or as two mirror halves, with two screws on the same side of the partings or on opposite sides of the partings. A contact point may be created between the coupling halves or between each half and the pipe, which is possible due to the centre lines of the screws being placed offset from the plane of sealing. According to one alternative embodiment of the invention the screws may be attached to the clamp coupling halves by some retaining means, such as a retaining ring, spike or the like, through for instance the screw holes.

When producing fine dispersions by introducing a non-miscible liquid in a controlled manner and in a safe way at high velocity into the process flow in the channel, the nozzle should be of adequate design. The designed nozzle may be a disperser or an injector. The nozzle may be fitted to any of the connection ports between sides of the flow plate and the flow channel, or the nozzle maybe placed close to the inlet of the flow channel or at the inlet of the flow channel, where the process flow is introduced into the channel. One or more immiscible liquid phases could simultaneously be fed through the nozzle. The designed nozzle could be a disperser having a mouthpiece in the form of a closed tube with a single hole area in the closed end having a hole diameter (D), or where multiple holes n are present a diameter (D) corresponding to the of the total area of the holes divided by the number of holes n of the nozzle, which is suitably larger than the length or depth (T) of the hole in the nozzle, see FIG. 17, and the ratio may be selected so that the length of the hole is much smaller than the diameter of the hole (T<<D). When the disperser is in use droplets will be sprayed out of the disperser and create a cone of droplets in the process flow. The size of the droplets that are created depends on the pressure difference at the outlet of the nozzle and the pressure in the main stream conduit. If the length of the hole (T) is large then it will be very difficult to create the desired pressure condition at that point.

For small size nozzles length (T) and diameter (D) will be very small and manufacturing limitations will occur. A favorable way to make such a nozzle is for instance to use etching, laser piercing or micro-drilling on a thin plate which then is orbital welded by laser or by electron beam on to a tube. A nozzle can produce droplets and the droplet size will depend on the flow and the selected nozzle diameter.

To increase flow through one nozzle it's possible to make a larger hole or to make more holes through the nozzle. By using many small holes instead of one big hole then it is possible to create smaller droplets. To make sure to have the same pressure condition in each hole it is favourable to arrange the holes axisymmetrically relative to the main axis of the tube on which the nozzle is orbitally welded. There may be several rows of holes located in concentrical circles. The hole size could be chosen according to the flow velocities for the radius of the concentrical circle or the viscosity of the fluids passing out of the holes. The spraying of materials out of the nozzle may be in a pulse-mode, continuously, or be sprayed in intervals adapted to the application of the multipurpose flow module.

A pump may be connected for supplying and to pressurize the fluid to the nozzle. The fluid will be sprayed out of the nozzle in a cone shaped fashion. The pump could either continuously pump fluids to the nozzle or feed the nozzle in a pulse-mode. The pulses can for example be generated by control of the pump's work cycle or by a valve in the feed line to the nozzle. The pump is suitably controlled to maintain a given pressure level. If the nozzle is fed in pulse-mode according to one alternative embodiment of the invention, then it could be important that the volume between nozzle and pulse valve does not change with pressure. The duty cycle of the valve, i.e. the open time is less or equal to 100% of the total period time and is ≠0%, can be controlled to give a given flow rate, which can be seen below.

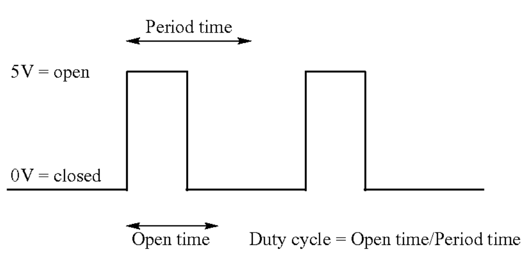

The nozzle can be operated in pulsed or unpulsed modes, and is used for making fluid spray at a given average flow rate.

The nozzle size was chosen to give a sufficient flow rate at the pressure available and the pressure level was set to give a certain droplet size. This means that the droplet size could be adjusted by changing the pump pressure at a constant flow rate. The pump speed was controlled to give a set flow rate through the open valve i.e. unpulsed mode.

Any gas contained or produced in the process fluid may be vented out, or degassed, from the flow channel by conduits in the gasket from a membrane surface to the edge of the gasket. A degassing system may be connected to an outlet of the flow channels, to an inlet of the flow channel, or both, or the degassing system may be connected to the connections on the sides of the flow plates. Any type of degassing system may be connected to the multipurpose flow module.

Pressure release devices may be connected to any number of connection ports or to a flow channel inlet, a flow part outlet, or between a flow part outlet and a flow part inlet. The pressure release may be passive or active. A passive pressure release device may be a bursting foil, but any suitable passive pressure release device may be used. An active pressure release device may be any number of injection units for quenching materials or substances, which may be acting on command from a computer equipped with a monitoring and control program. Another active pressure release device may be a flow-regulating device of heat exchanger fluids, which also may be acting on command from a computer equipped with a monitoring and control program. Yet another active pressure release device may be a flow-regulating device for process materials or for added materials, which also may be acting on command from a computer equipped with a monitoring and control program.

The multipurpose flow module may be used in a laboratory for running experiments, in which flexibility is an important feature. The multipurpose flow module may be used as a pilot plant, may be used as a full scale multipurpose flow module, or may be used as a full scale designed flow module. The multipurpose flow module may be for use as a reactor, an extractor, a separating tool, a mixing apparatus, etc. to design processes, or combinations thereof.

The performance of the multipurpose flow module will herein after be described in principal. The design of the flow channels is suitably made for flexibility in the purpose of the desired process. It is favourable for many processes that mixing of miscible fluids at a desired flow rate will result in uniform and small micro-mixing timescale corresponding to a desired pressure drop per plate. Therefore, the flow channel of each flow plate or flow section is having a compact design and the length of each channel is designed for the purpose of the flow module. The flow channel has one or more mixing zones in the form bends or curved zones. The mixing zones may be in the form of corners at the bends or the curved zones of the flow channel according to one alternative of the invention. The mixing zones could be micro mixing zones. The design of the multipurpose flow module offers good heat transfer, which favours tempering of chemical reactions, mixing of fluids, extractions, etc. High heat transfer comes from a combination of traditional convective heat transfer into the utility fluid and conductive heat transfer through the heat conducting material of the multipurpose flow module. The combination of good mixing and redistribution of fluid within the flow channel and the high heat transfer rates will provide excellent thermal control of the flow medium.

The multipurpose flow module may operate at normal and elevated pressures through for instance incorporation of a downstream flow restrictor. The current maximum pressure will be different for different gasket materials and may change depending on the chosen design and chosen material of the multipurpose flow module.

Another property defining the multipurpose flow module for a certain desired process is the residence time distribution, and the residence time distribution is dependent on other properties such as range of flow rates, fluid viscosities, etc.

Non-laminar flow is established at a lower flow rate in the flow channel of the multipurpose flow module of the invention than in for example a plain pipe having a circular cross section of similar area. The flow pattern within the flow channel is similar at low and high flow rates. This is not the case with a plain pipe. At low flow rates the bulk or macro scale mixing is greater, faster, or both in the flow channel of the multipurpose flow module of the invention than in a plain pipe. A lab scale, a pilot scale, or a full production scale multipurpose flow module has similar flow properties and thus also the flow patterns and hence the mixing mechanisms are similar.

To operate the multipurpose flow module of the invention involves creating a plug-flow in the flow channel of the module, which is established by the non-laminar flow. The flow of material in the flow channel is exposed to mixing by the design of the flow channel to form big or small vortexes in the flow of materials. The more intensive design of the flow channel the more turbulence in the fluid flow. The principle of plug flow is for each drop, particle, molecule etc. "first in first out" of each section of the flow.

The multipurpose flow module according to one alternative embodiment of the invention may be used for extraction, for reaction, for mixing, or combinations thereof, and the method of operating the module comprises introducing a first flow of materials through one or more inlet means into a flow channel, transferring the first flow materials through the flow channel, optionally introducing one or more additional materials into the first flow materials through one or more additional connection ports, regulating flow of materials, flow rates, residence time or combinations thereof, by aid of inlet dispersers, inlet valves, outlet valves, or combinations thereof, which inlet dispersers, inlet valves, outlet valves, or combinations thereof are, or are not, controlled by modulated signals from one or more sensor units, and measuring temperatures by aid of one or more thermo elements, and controlling heat transfer from one or more heat exchanger plates.

According to another alternative embodiment of the invention may the method for extraction, for reaction, for mixing, or combinations thereof, in a multipurpose flow module comprise introducing a first flow of materials through one or more inlet means into a flow channel, transferring the first flow materials through the flow channel, optionally introducing one or more additional materials into the first flow materials through one or more additional connection ports, creating a plug flow of materials in the flow channel.

The method may comprise that the flow of materials in the flow channel is regulated to create a plug flow of materials through the multipurpose flow module. The plug flow may be created by aid of mixing zones.

One or more sensor units may be sending signals to a computer or data processing unit and the computer or data processing unit controlling and sending information to flow regulating units and temperature regulating units.

The multipurpose flow module may be used as a reactor, an extractor, or a mixer, or for manufacture of chemical substances or products for pharmaceuticals or to be used as pharmaceuticals, or may the module be used for manufacture specially designed chemicals.

Use of a multipurpose flow module may be use as laboratory equipment, as pilot plant or as full-scale process equipment.

In the following will the invention be explained by the use of FIGS. 1 to 25. The figures are for the purpose of demonstrating the invention and are not intended to limit its scope.

DETAILED DESCRIPTION OF THE EMBODIMENTS

Figure 1:
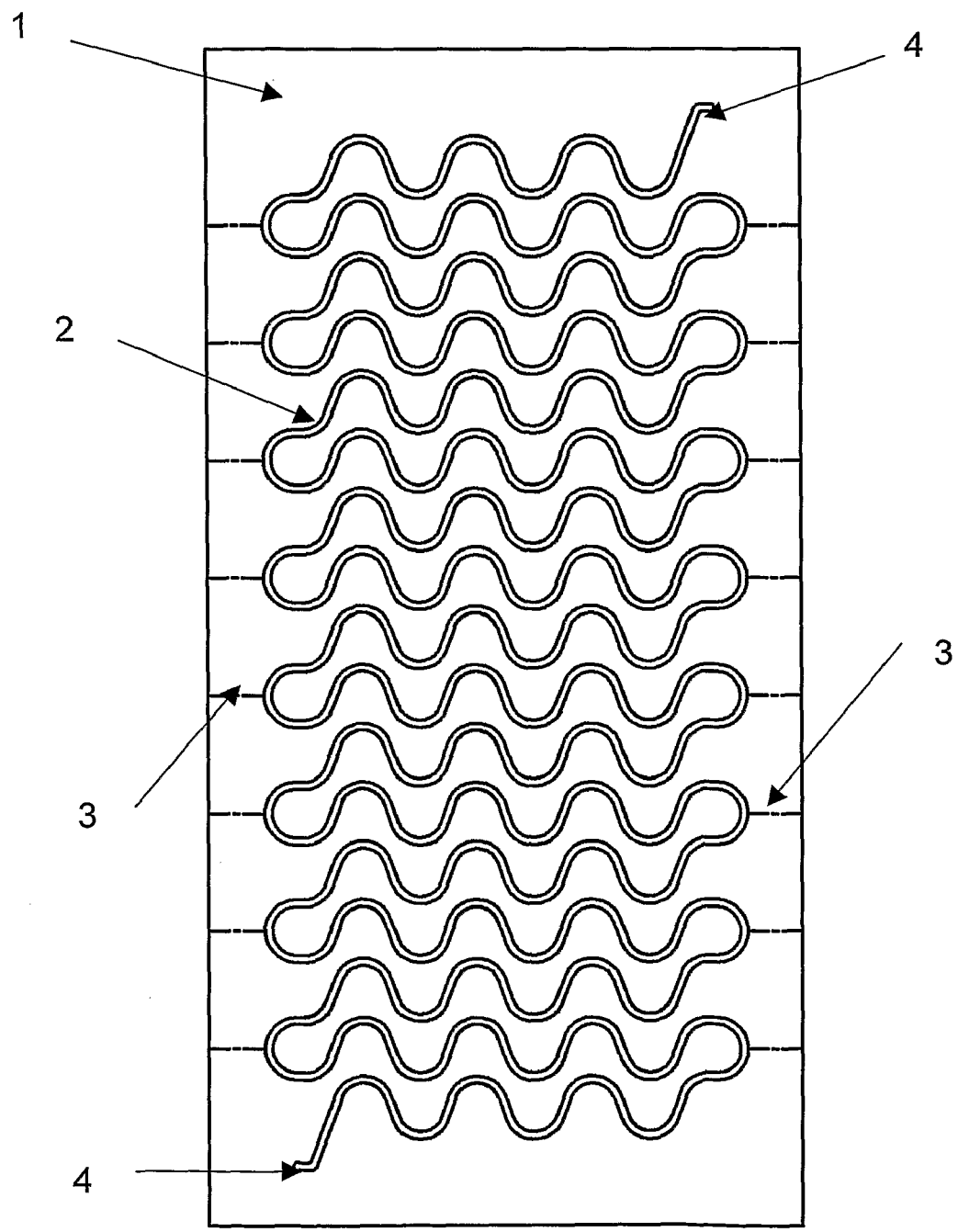
FIG. 1 shows a flow plate having a flow channel according to one alternative embodiment of the invention.
Figure 2:
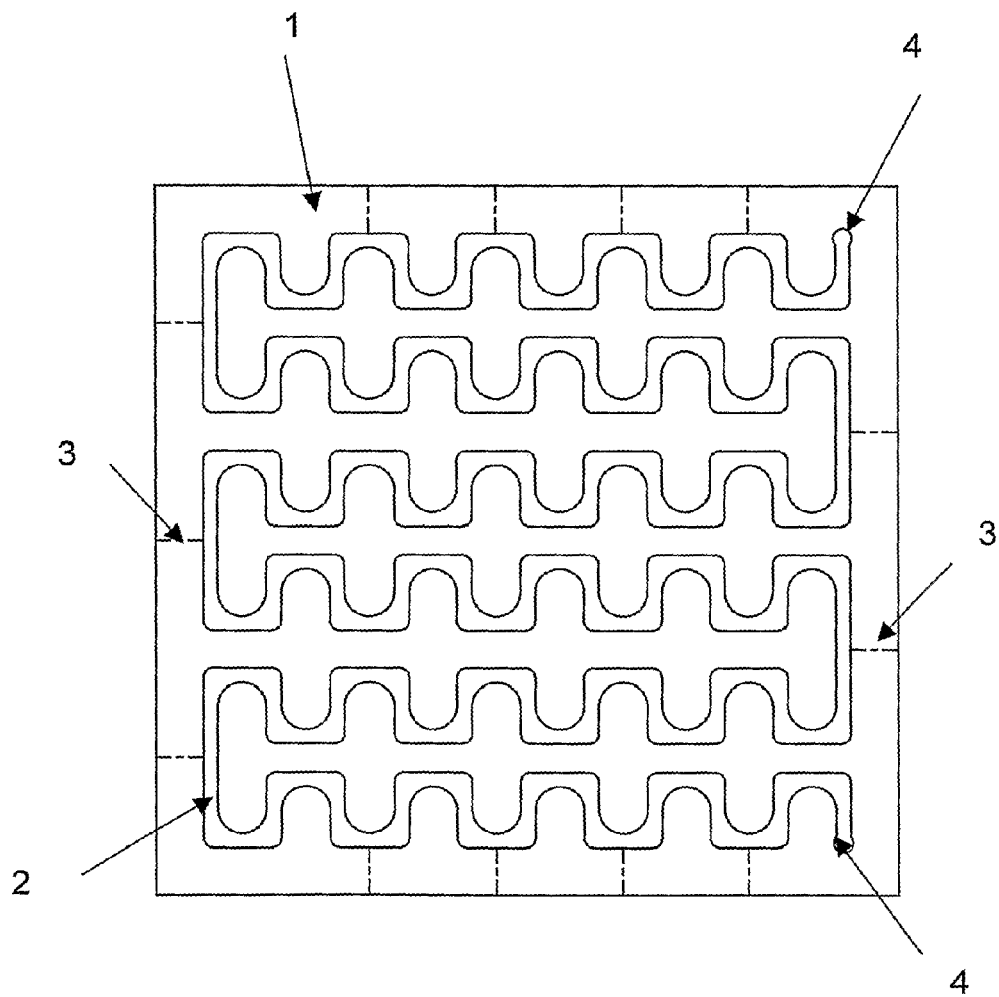
FIG. 2 shows a flow plate having a flow channel according to another alternative embodiment of the invention.
Figure 3:
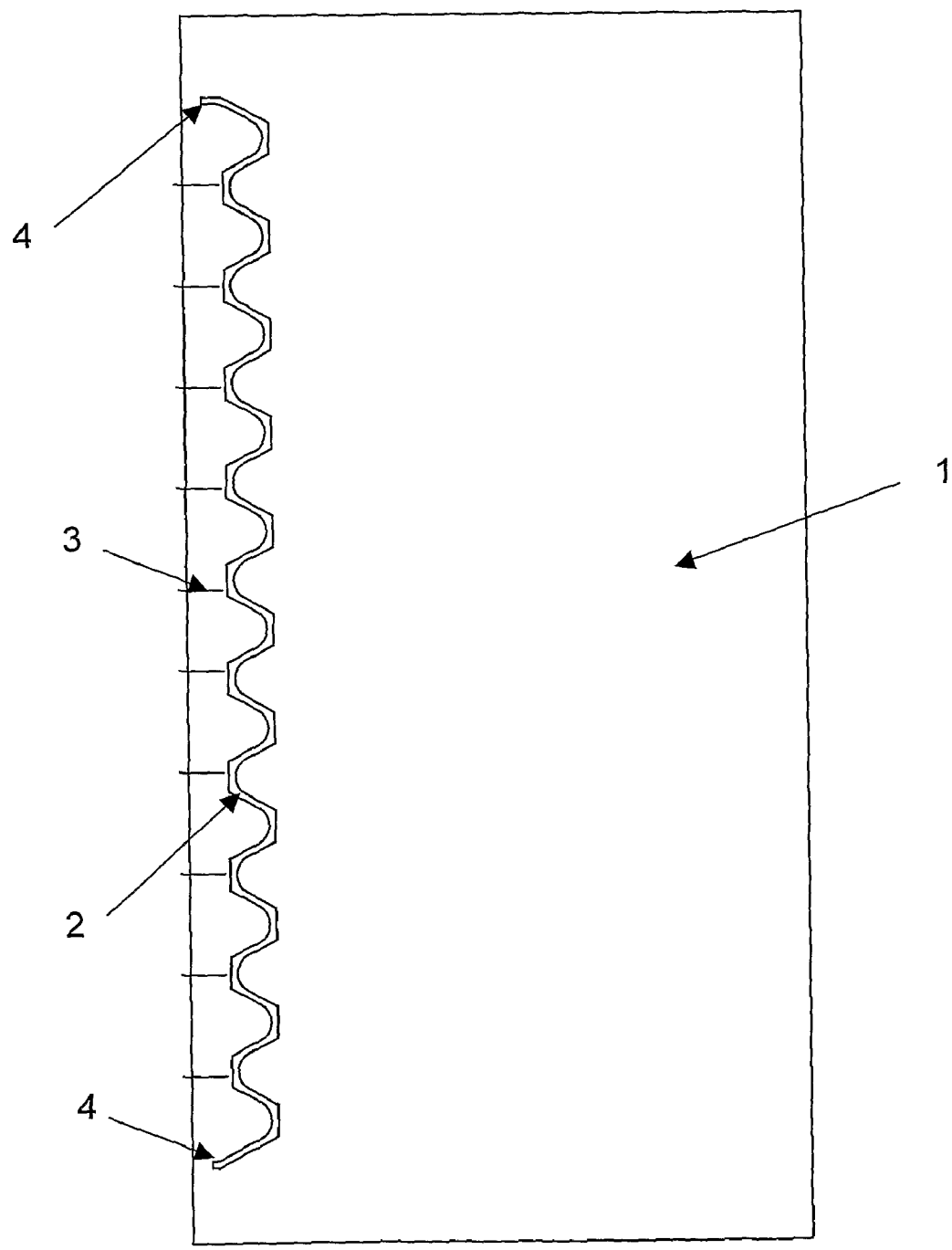
FIG. 3 shows a flow plate having a flow channel according to another alternative embodiment of the invention.
Figure 4:
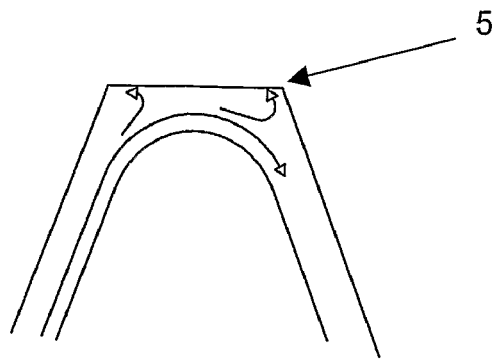
FIG. 4 shows a bend on a flow channel according to one alternative embodiment of the invention.
Figure 5:
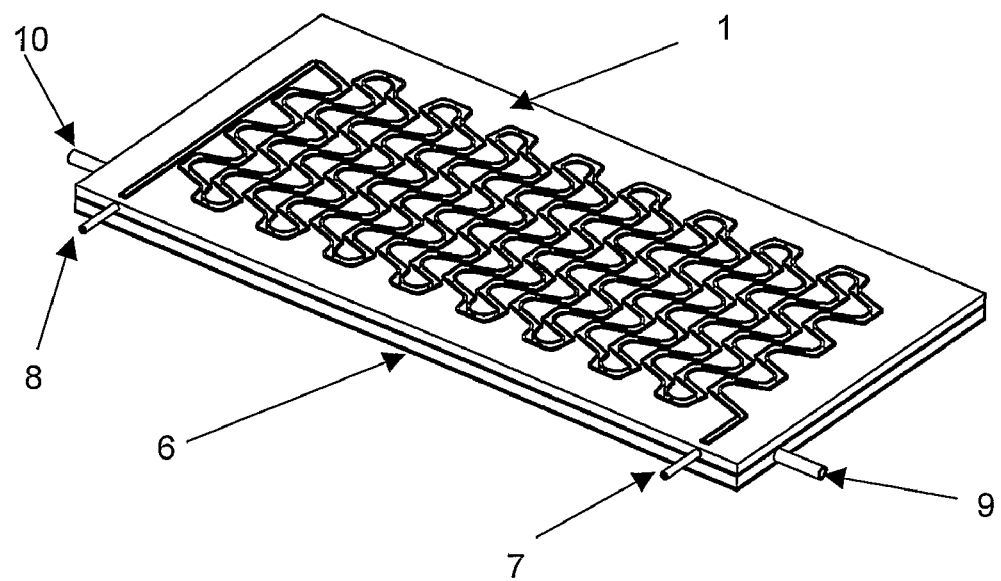
FIG. 5 shows a flow section according to one alternative embodiment of the invention, having a flow plate on top of a heat exchanger plate.
Figure 6:
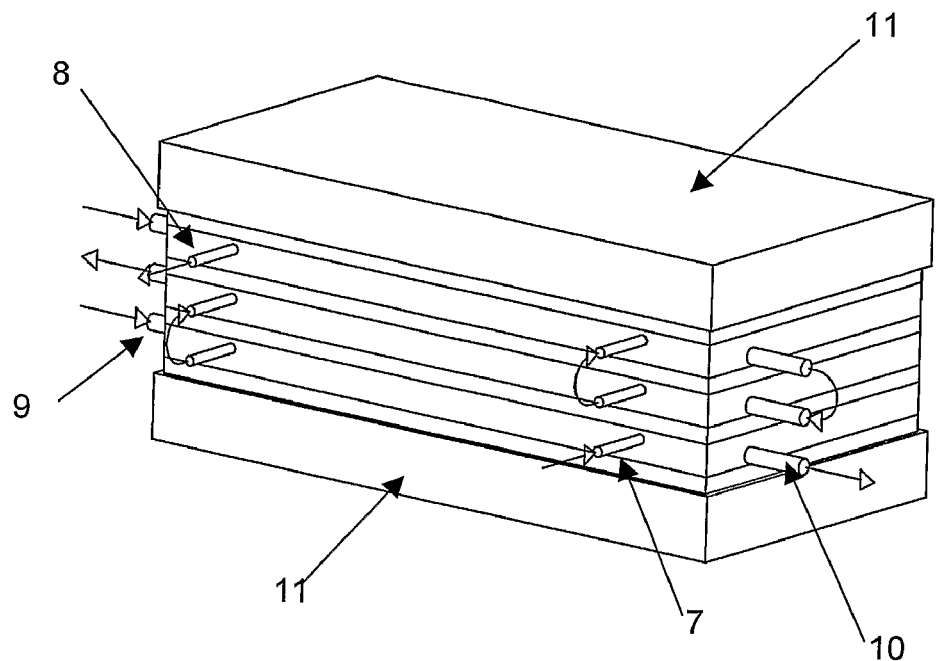
FIG. 6 shows a stack of sections according to one alternative embodiment of the invention.

Flow plate 1, shown in FIGS. 1, 2 and 3, has a flow channel 2, which has a designed curvature covering flow plate 1. On each sides of the flat flow plate may a number of connections 3, between the flow channel and the outer side of the flow plate, be arranged to harbour inlets for materials or substances, or outlets for products, or may the connections harbour sensors, thermo elements, or equipment for sampling test samples or process samples. Ends 4 of the flow channel harbour either an inlet for process material or an outlet for process products. The outlet end may be externally or internally connected to an inlet end of another flow channel on another flow plate not shown in FIG. 1, 2 or 3. The curvature of the flow channel may be densely packed, see FIG. 2, or short with few curves as in FIG. 3: The curvature and the length of the flow channel is depending on time scale of the unit process operations, or on the reaction time etc. or on the heat transfer. According to one alternative embodiment of the invention may the flow channel have sharp corners 5, see FIG. 4, which sharp corners are on the outer side of each bend of the curvature of the flow channel to create mixing zones in the flow channel. In FIG. 5 is reaction plate 1 arranged on top of a heat exchanger plate 6 providing a flow section having an inlet tube 7 for process material connected to the flow plate and one outlet tube 8 for products. On the heat exchanger plate has one inlet tube 9 and one outlet tube 10 for heat exchanger fluids. The heat exchanger fluids may flow against the process flow or may flow with it depending on the heat transfer, thus can the inlet tubes and the outlet tubes have their places changed. FIG. 6 is showing a number of flow plate sections and heat exchanger sections arranged between two end plates 11. The figure is also showing the external connections between inlet tubes 7 and outlet tubes 8 of the flow plates, and between inlet tubes 9 and outlet tubes 10 of the heat exchanger plates.

Figure 7:
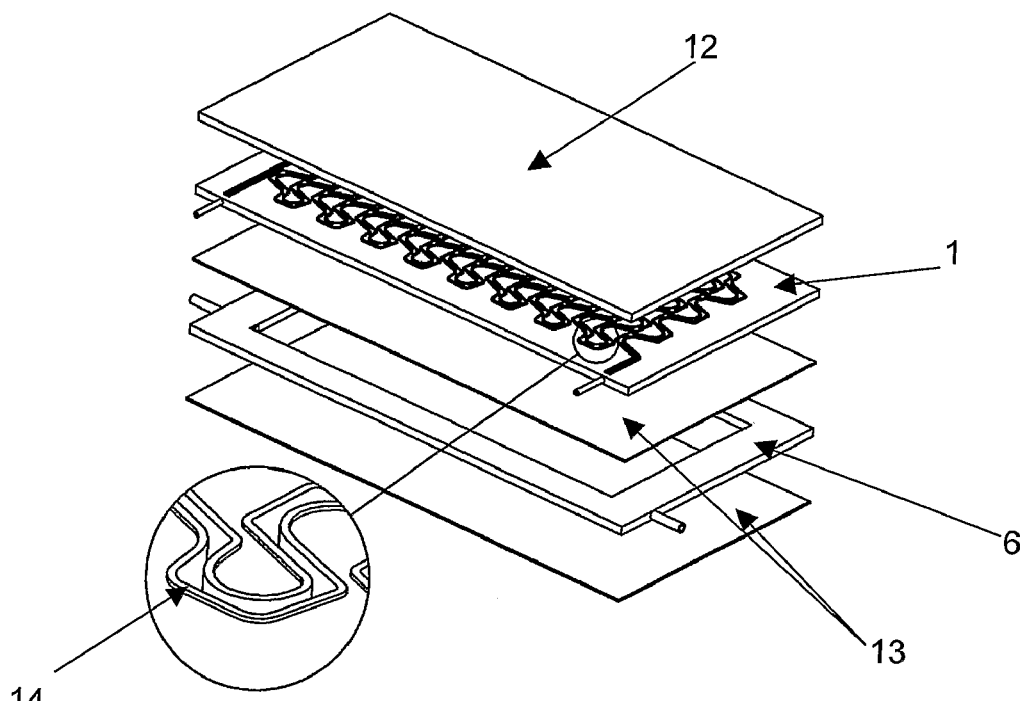
FIG. 7 shows a flow section according to one alternative embodiment of the invention comprising one gasket, one flow plate, two barrier plates on both sides of a heat exchanger plate, and in detail a flow channel having protruded zones.

An example of a flow section is shown in FIG. 7 wherein a gasket 12 of any suitable material, which may be a plate built of ePTFE fabric, is placed on top of a flow plate 1. A barrier plate 13 can be permanently welded, brazed, or both, or bonded to flow plate 1 and to heat exchanger plate 6. On the opposite side of heat exchanger plate 6 is another barrier plate 13 arranged. When stacking together several flow sections then gasket 12 will seal or close the flow channel against barrier plate 13 of for example a heat exchanger plate not shown in the figure. To enhance the sealing or closing between barrier plate 13 and flow plate 1 there are protruded zones 14 arranged next to each rim of the flow channel, see detailed part of FIG. 7. Protruded zones 14 may be placed on both sides of the flow plate 1.

Figure 8:
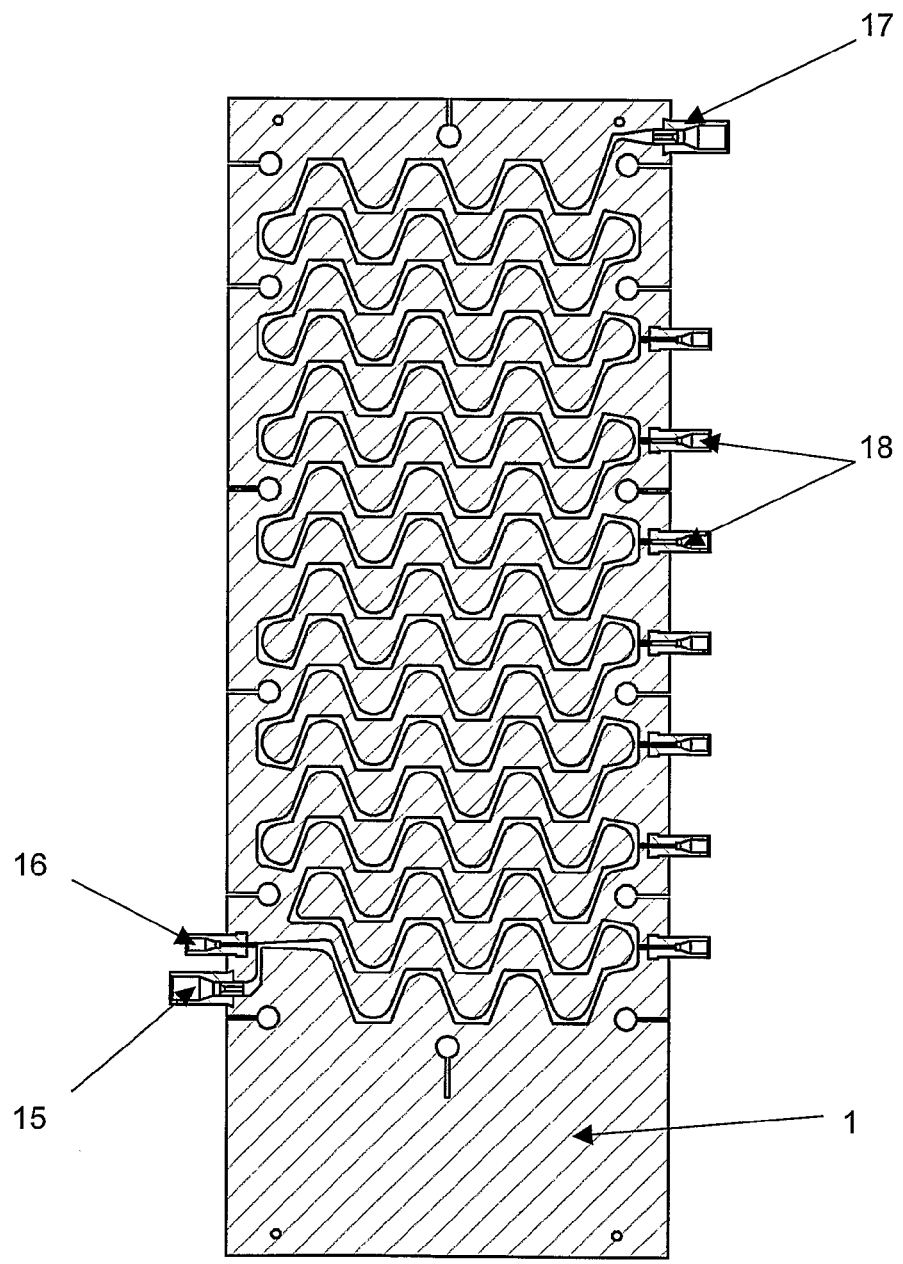
FIG. 8 shows a flow plate according to one alternative embodiment of the invention.

One alternative example of a flow plate 1 is shown in FIG. 8. According to this example process fluid is introduced to the flow channel through inlet 15 and one or more substances are added through inlet 16. The substances are mixed, extracted, separated, reacted or combinations thereof along the flow channel and will leave the flow channel of the flow plate through outlet 17. Through a number of connections 18 may the process flow be monitored by the use of equipments adequate for the specific purposes. Substances or reactants may be added through connections 18 or test samples may be sampled through them. If the connections are not used then they may be plugged and sealed to eliminate leakage. Connections 18 may be attached on one side of the module or on both depending on the specific or intended use.

Figure 9:
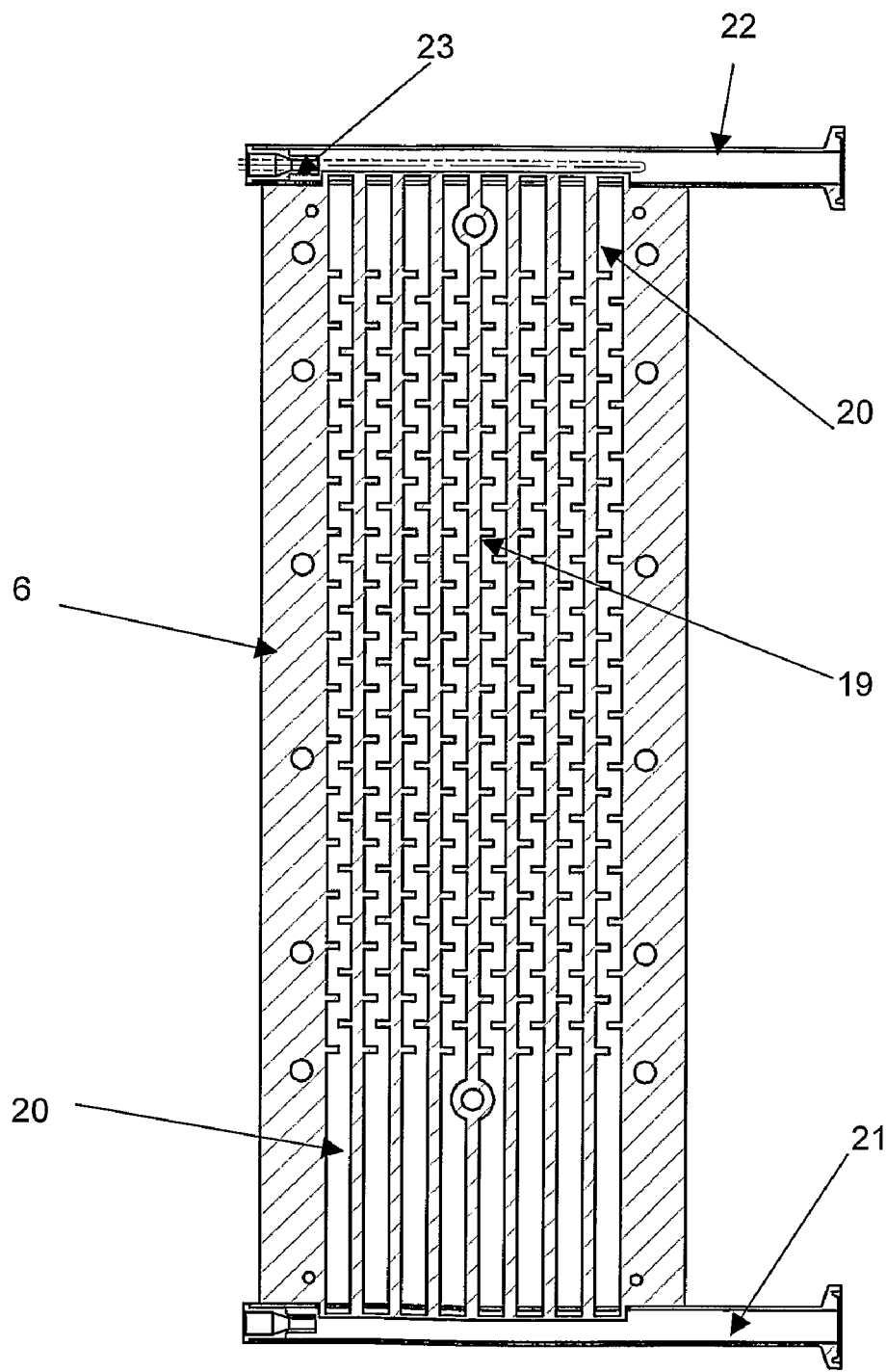
FIG. 9 shows a heat exchanger plate according to one alternative embodiment of the invention.
Figure 10:
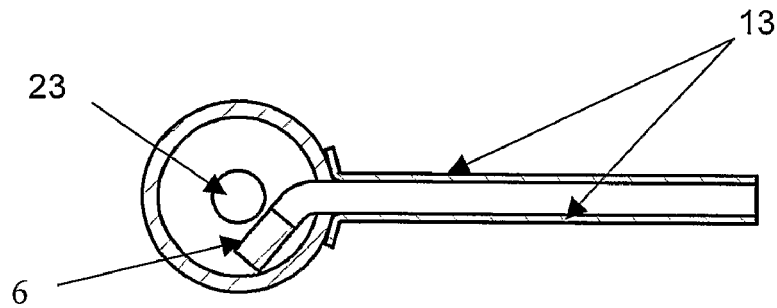
FIG. 10 shows a cross section of an inlet tube or an outlet tube having a heat exchanger plate inserted according to one alternative embodiment of the invention.

In FIG. 9 a heat exchanger plate 6 according to one alternative example of the flow module is integrated with an inserted element 19, which inserted element is having wings or fins attached in heat exchange fluid channels 20 to enhance the heat transfer. Heat exchange fluid channels 20 are connected to one inlet tube 21 and one outlet tube 22 for heat exchanger fluids. To either inlet tube 21 or to outlet tube 22 may thermo elements 23 be inserted. One alternative example of the connection between heat exchanger plate 6 and one of inlet tube 21 or of outlet tube 22 can be seen in FIG. 10. On both sides of heat exchanger plate 6 are barrier plates 13 closing heat exchange fluid channels 20 and tubes 21 or 22. The figure is also showing a cross section of a thermo element 23 in the middle of the tube.

Figure 11:
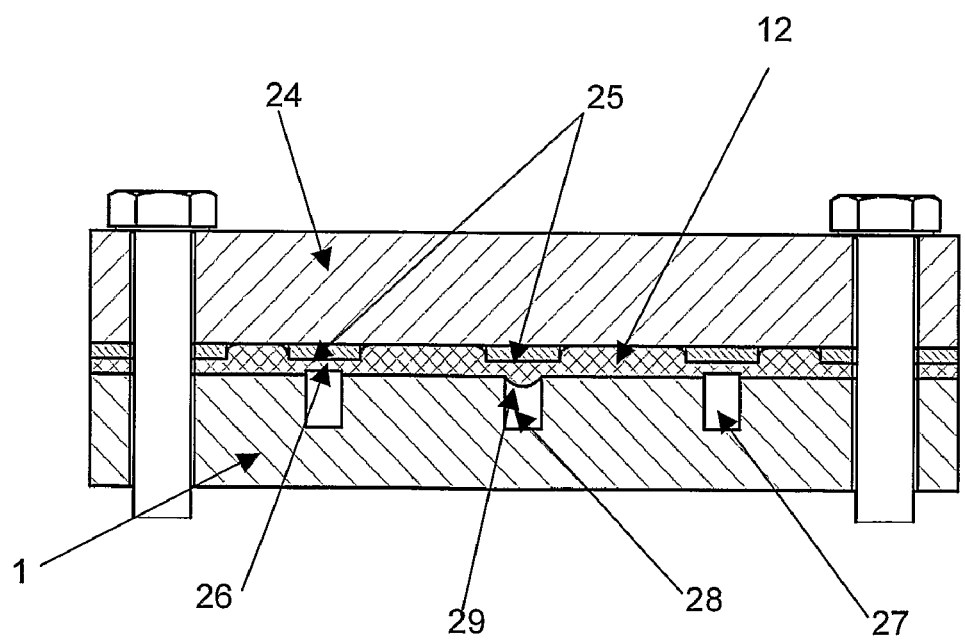
FIG. 11 shows a flow plate sealed with a gasket.
Figure 12:
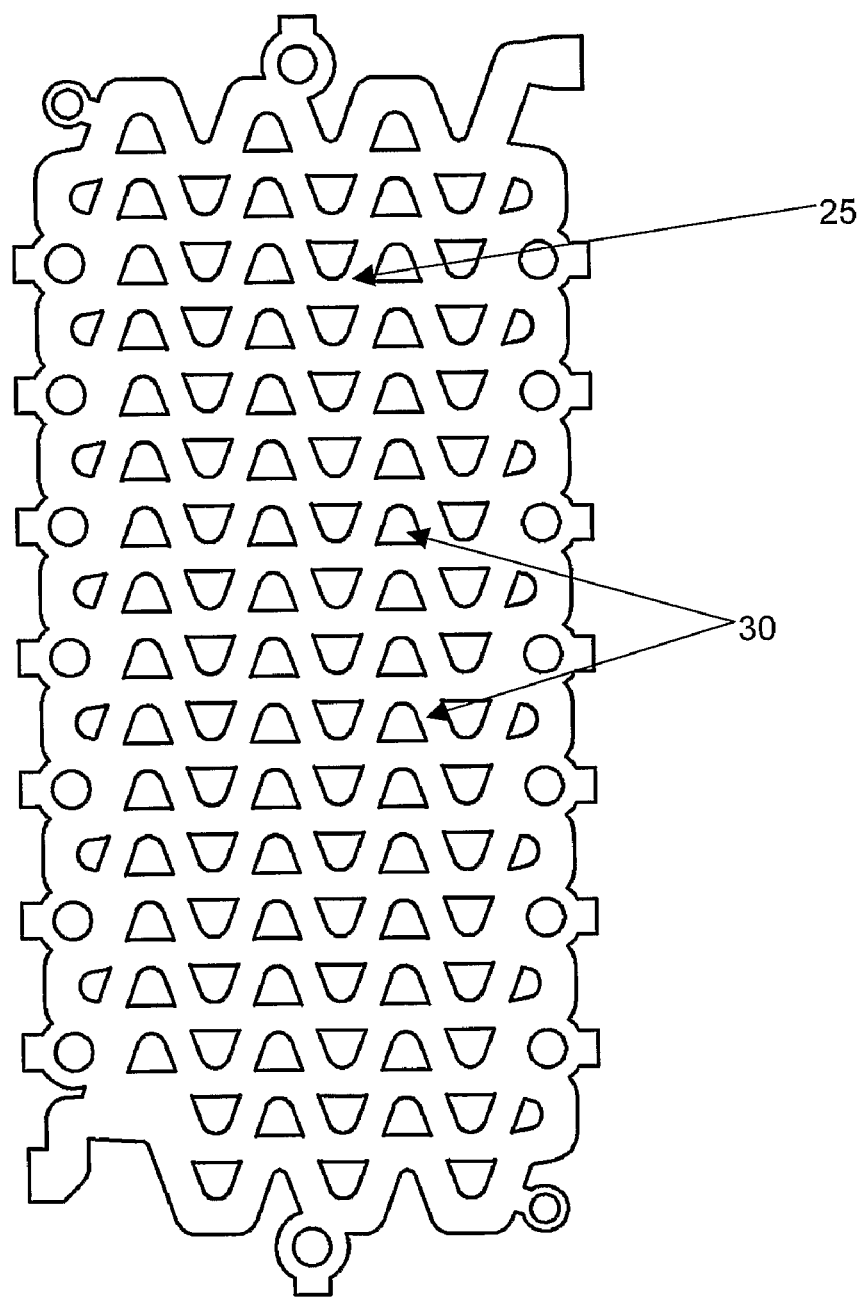
FIG. 12 shows a pressure plate for sealing a flow plate together with a gasket according to one alternative embodiment of the invention.
Figure 13:
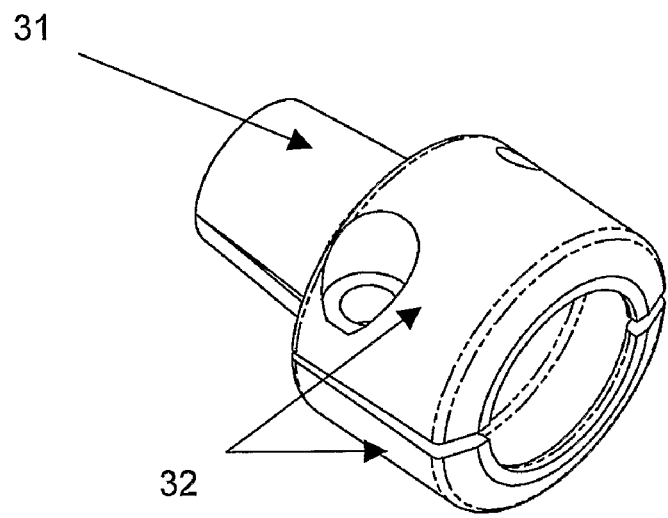
FIG. 13 shows a clamp coupling according to one alternative embodiment of the invention.
Figure 14:
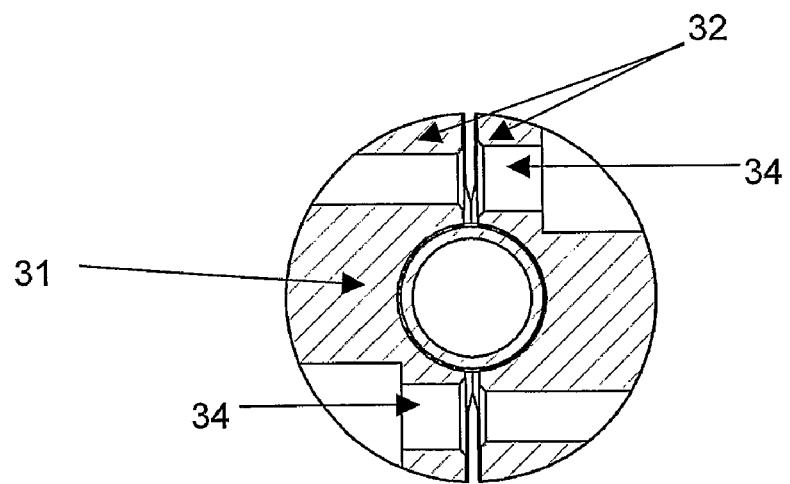
FIG. 14 shows a cross-section of a clamp coupling according to one alternative embodiment of the invention.

Between a flow plate 1 and an end plate 24 is a gasket 12 placed to close or seal the multipurpose module. End plate 24 may be replaced by a barrier plate or any other suitable plate. According to one alternative embodiment, FIG. 11, may a pressure plate 25 be placed opposite to the flow channel on the other side of the gasket, between gasket 12 and plate 24. Parts of the gasket having imprints or compressed areas 26 corresponding to the flow channel will result in a more uniform cross section 27 than that of cross section 28, which has no prepared areas and therefore will have a contour 29 of the gasket, which is not pre-intended. Pressure plate 25, see FIG. 12, may have a pattern 30 mirroring the pattern of flow channel 2 of flow plate 1 not seen in the figure.

Figure 15:
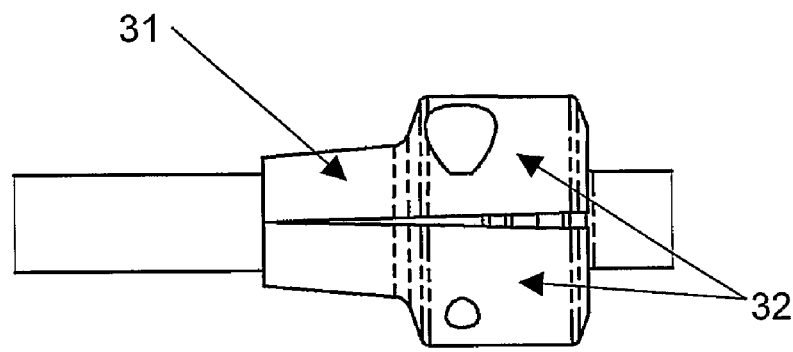
FIG. 15 shows a side view of a clamp coupling according to one alternative embodiment of the invention and an inlet tube and an outlet tube.
Figure 16:
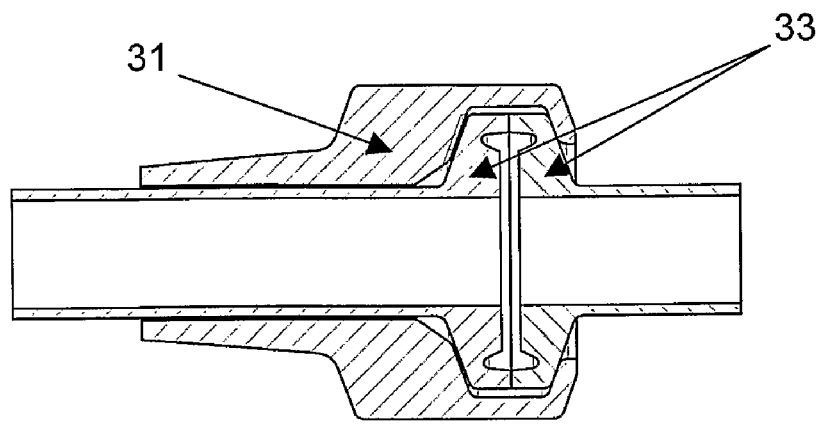
FIG. 16 shows a longitudinal cross-section of a clamp coupling according to one alternative embodiment of the invention or an inlet tube and an outlet tube.

According to one alternative embodiment of the invention there is a coupling and a clamp sealing the connection between flow channel outlets and flow channel inlets when there are more than one flow plates. FIGS. 13, 14, 15 and 16 are all showing a clamp 31 divided into two halves 32. The diameter of flanges 33 seen in FIG. 16 is just slightly smaller than the inner diameter of the clamp 31. When the screws are squeezing together halves 32, then the halves will be closing, or sealing the coupling. The halves of the clamp may be made as two identical halves or as two mirroring halves. The clamp can be designed with the two screws on the same side of the parting, or with one screw on each side of the parting as in FIGS. 13 and 14. The clamp has to be designed so that a second point of contact, see the left hand side of FIG. 15, is created at the opposite end to the plane of sealing and hence locating the screws between the sealing flanges and the second point of contact. A contact point can be created between the clamp halves or between each half and the pipe. The clamp may be opened or closed with a special tool, which sometimes can be advantageous for safety reasons or for convenience when located in a narrow space. The screws can be attached to the clamp through hole 34 seen in FIG. 14 by some retaining mean, like a retaining ring, so it doesn't fall off when the clamp coupling is open.

Figure 17:
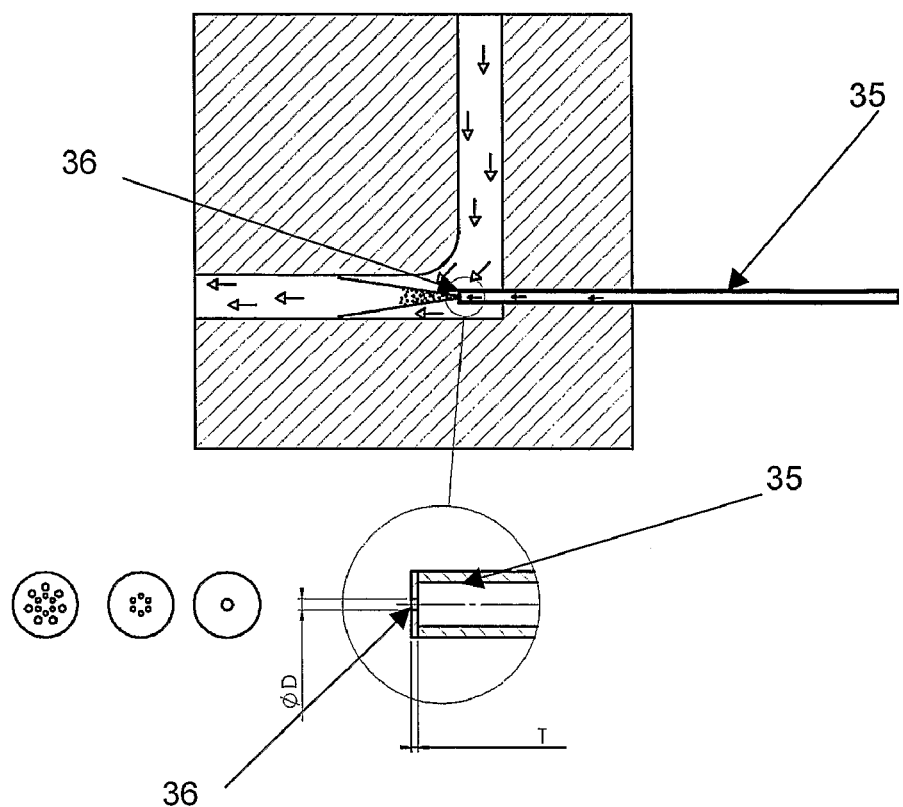
FIG. 17 shows a designed nozzle, i.e. disperser in function according to one alternative embodiment of the invention, and in detail a mouthpiece.
Figure 18:
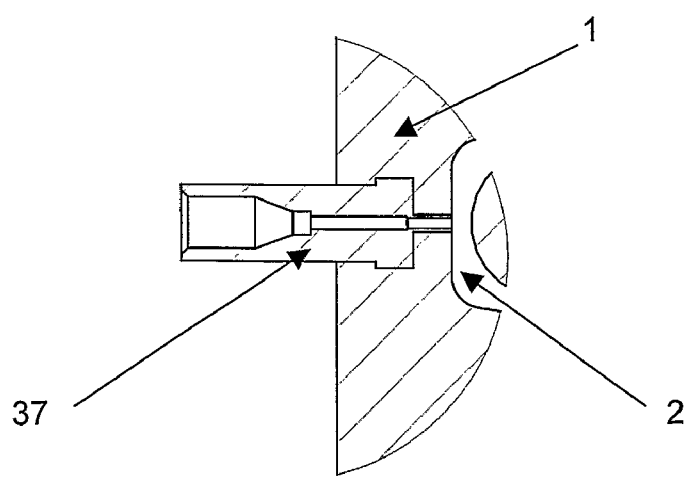
FIG. 18 shows a connection according to one alternative embodiment of the invention.

In FIG. 17 is a disperser nozzle 35 schematic viewed as tube having one or more holes 36 on the outlet side. The disperser nozzle is inserted in the flow channel to inject materials into the flow of the process fluids. At high fluid velocity through the hole or holes the injected materials will be sprayed out in a cone shape fashion into the process fluids. The spraying of materials may be in a pulse-mode, continuously, or be sprayed in intervals specially adapted to the application of the multipurpose flow module. At intermediate fluid velocity through the hole or holes the injected materials will form a jet passing into the process fluids. At low fluid velocity through the hole or holes the injected materials will form droplets at the end of the tube which are dislodged into the process fluids Nozzles, inlets, outlets, sensors etc. may be connected to flow channels 2 through connection ports 3, which could be any type of connections. According to one alternative embodiment of the invention may connections 3 be designed as connection 37 in FIG. 18 or as connection 18 in FIG. 8. Connection 37 may be removably fitted or be permanently fitted to the flow plate. If connections 37 are permanently fitted to the flow plate, then the connections may be brazed, welded or both to the flow plate. To connections 3 or connections 37 may any type of desired function be connected, the connections may also be plugged if no function is required.

Figure 19:
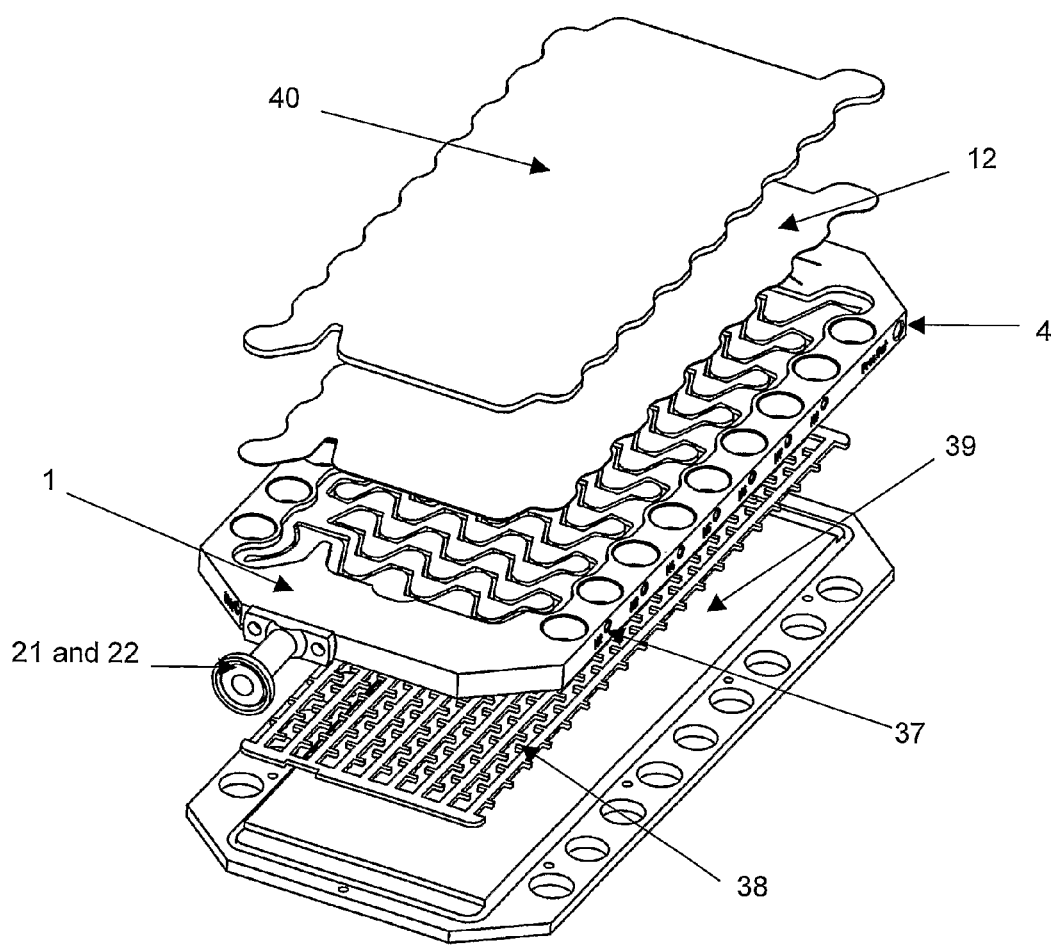
FIG. 19 shows an alternative of a flow section according to one alternative embodiment of the invention, having a flow plate on top of a heat exchanger plate.

FIG. 19 is showing an alternative of a flow section of the multipurpose flow module according to the invention. According to this alternative flow plate 1, barrier plate 13 and heat-exchanger plate 6 are manufactured as one integrated, solid piece in one material The "one piece" may be produced by spark erosion, by cutting, by milling or by moulding. This "one piece" comprises a flow channel 2 and connection ports 37, which corresponds to connections ports 3 in FIGS. 1 to 3 and to connections 16 and 18 in FIG. 8. Flow channel 2 and connection ports 37 are communicating that any type of functions could be connected to the flow channel as described above, it could be for instance inlets for reactants, inlets for other or additional fluids, inlets for any other media needed for desired process, outlets for process fluids, outlets for intermediate products to be fed into the flow channel at a later stage, outlets for test samples of process fluids from the flow channel, outlets for samples to be analysed continuously online or by batch samples by means of ultraviolet light (UV) spectrometers, infrared light (IR) spectrometers, gas chromatography, mass spectrometers (MS), nuclear magnetic resonance NMR, etc. to identify the intermediate products or substances and to control the process performance according to "Process Analytical Technology" (PAT). According to one alternative of the invention may one or more of the connection ports be injection ports. The "one piece" comprises also inlets 4 and outlets 4 to flow channel 2. Since the "one piece" comprises both flow plate 1 and heat exchanger plate 6 then the "one piece" is connected to one inlet tube 21 and one outlet tube 22 for heat exchanger fluids. A gasket 12 is covering flow channel 2 and a plate 40, which could be a combination of a barrier plate 24 and a pressure plate 25, which plate 40 is placed on top of gasket to close or seal flow channel of the multipurpose module. A plate 39 which could be a combination of an insulating plate, a cover plate and a sealing plate is sealing the heat exchanger plate part of the "one piece". An inserted element 38 is inserted between the "one piece" and plate 39, which inserted element 38 is having channels with fins to increase the heat transfer capacity according to one alternative of the invention. The inserted element 38, could be any suitable type, which increases the heat exchanger surface of the flow section and promotes turbulence.

Figure 20:
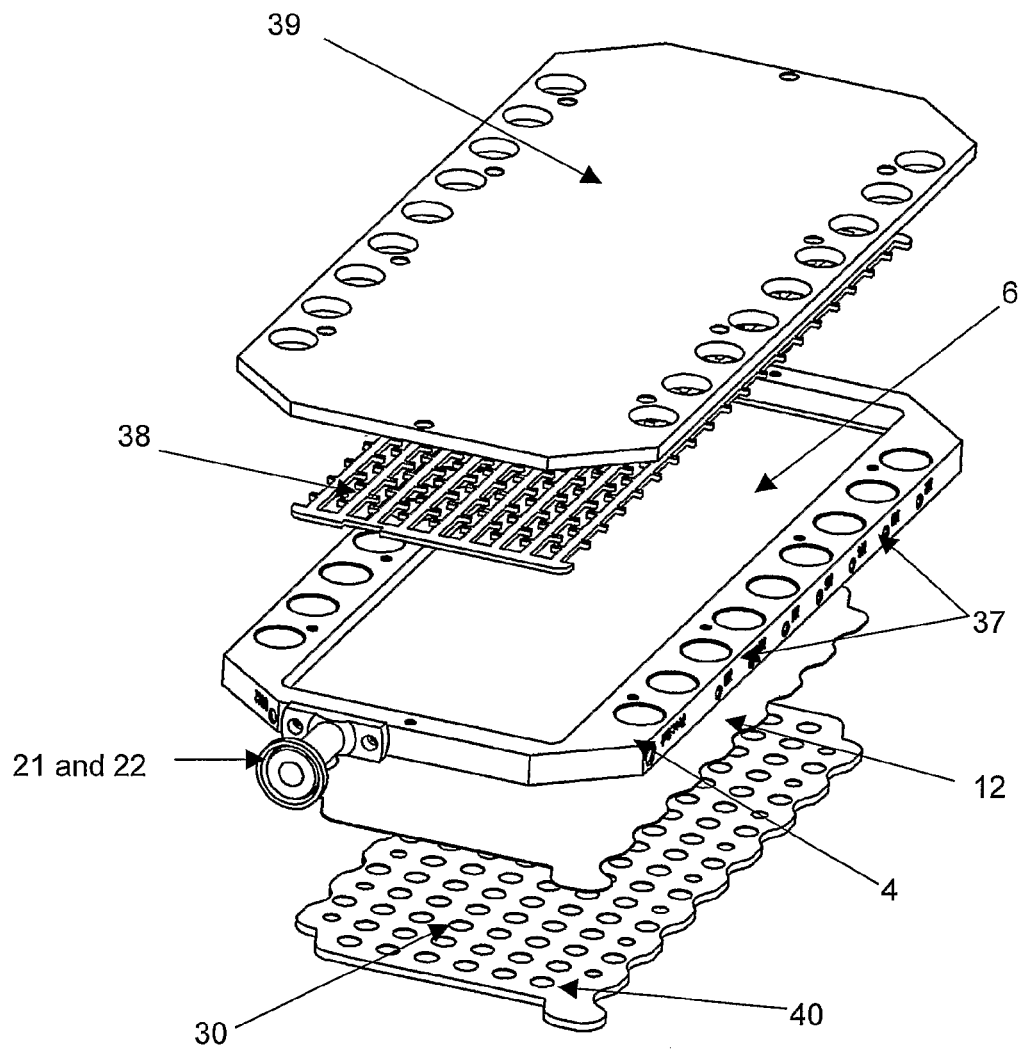
FIG. 20 shows the flow section of FIG. 19 seen turned around 180°.

FIG. 20 is showing the integrated flow section of FIG. 19, which is turned 180°. In this figure it is shown how an inserted element 38 is fitted into the heat exchanger plate part 6 of the integrated one piece. The heat exchange zone 6, corresponds to heat exchanger plate 6 of FIGS. 7, 9 and 10. A plate 39 is placed to seal the heat exchanger plate part 6 of the integrated flow section. Plate 39 could be a combination of a insulating plate and a barrier plate according to one alternative. The material of plate 39 could be any suitable type and the plate is appropriately selected to suit the application of the multipurpose flow module. In this figure plate 40 is having grooves or hollows 30, which are corresponding to the pattern of the flow channel 2, not seen in this figure.

In the following will the invention be illustrated by the use of Examples 1 to 5. The purpose of the Examples is to illustrate the performance of the multipurpose flow module of the invention, and is not intended to limit its scope of invention.

Example 1

In Example 1 a multipurpose flow module was tested, which module operates at process flow rates of 1.5-10 l/hr (0.1-0.7 m/s). The flow rate in this example was 5 l/hr. The micro-mixing timescale in a water-like fluid, as determined by reactive mixing experiment, was 30 milliseconds. This corresponds to a pressure drop of 0.5 Bar per flow plate. The utility fluid was water having a temperature at about 10° C. and a flow rate of 40 l/hr was cooling a hotter process fluid, which had a flow rate of 5 l/hr—in the initial part of the module are cooling rates of more than 30° C./s achieved for this pseudo co-current configuration.

The combination of good mixing and redistribution of fluid within the channel and the high heat transfer rates were combined to provide excellent thermal control of the reaction medium. The pressure was up to 20 bar—referring to a stainless steel reactor with GORE® ePTFE gasket and HPLC fittings.

Figure 21:
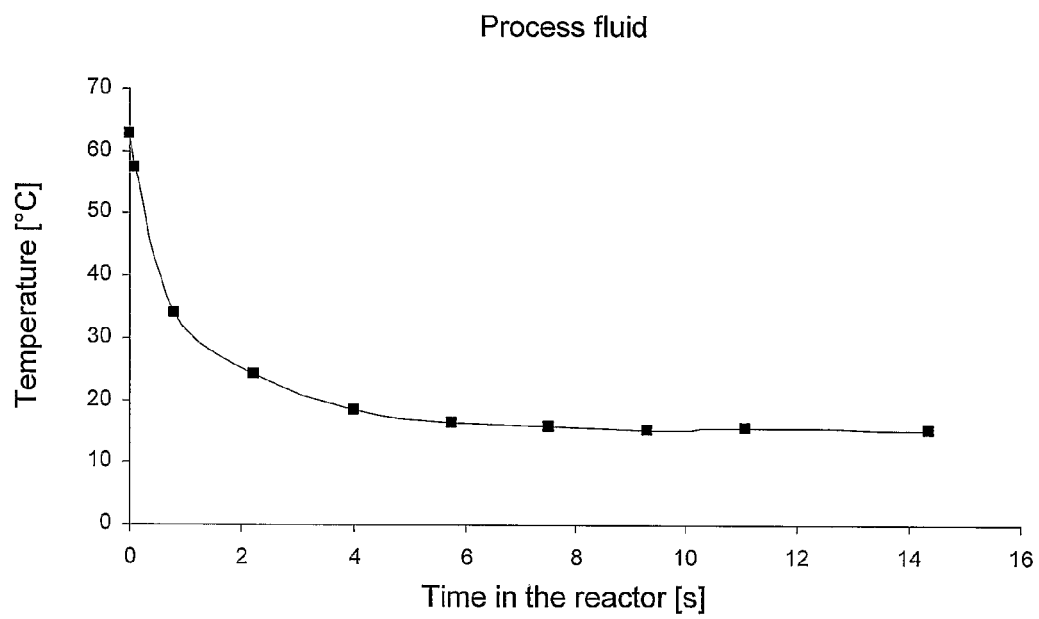
FIG. 21 is a graph showing the thermal profile of the process fluids on travelling along the flow channel of Example 1.

The design of the multipurpose flow module also offers good heat transfer, which benefits the heating, or more often cooling, of for instance chemical reactions. The graph in FIG. 21 shows the thermal profile of the process fluids on travelling along the flow channel.

Example 2

A multipurpose flow module was tested in this example, the dimensions of the flow channel of the module were: cross-section 1.5 mm×2 mm in average, process hydraulic diameter 2.16 mm, length of the flow channel 3.113 m. The flow rates were within the range of 1-10 l/hr during the tests.

Figure 22:
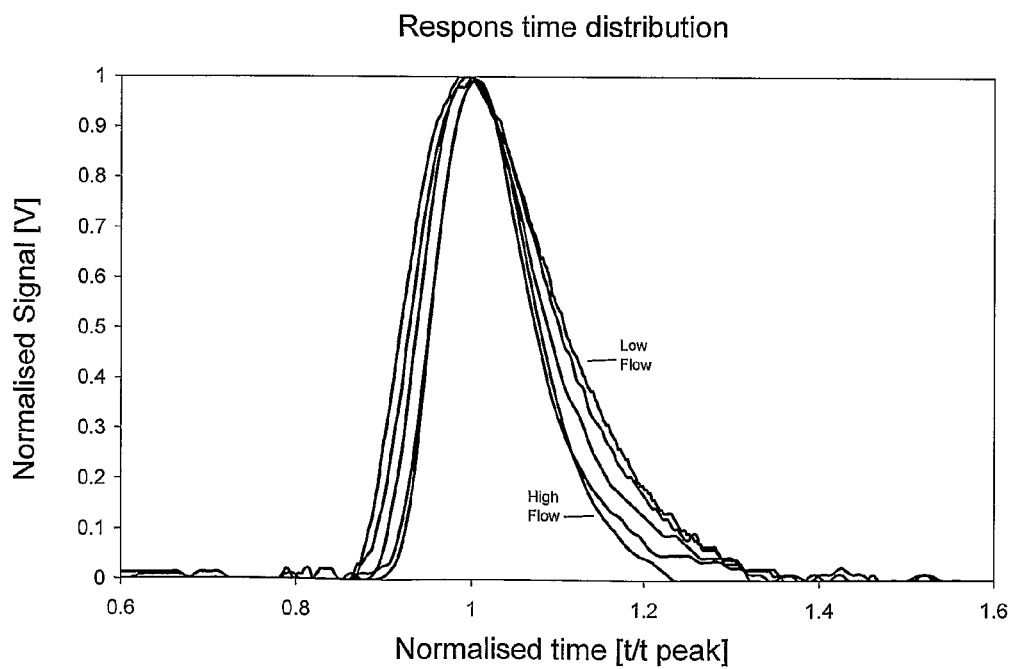
FIG. 22 is a graph showing the hydrodynamic properties of the residence time distributions in relation to flow rate of Example 2.

The shape of the residence time distributions were similar at all flow rates tested, which can be seen in FIG. 22, indicating common hydrodynamics across these conditions. FIG. 22 shows a smooth peak, with sharper rise and longer decrease. The width of the distribution decreases as the flow rate is increased. There are neither short cuts nor stagnant regions, thus a plug flow was created in the tested flow channel.

Example 3

In Example 3 a disperser nozzle was tested in a multipurpose flow module. The nozzle flow was measured in continuous operating mode, for different sized nozzles, for a range of feed pump operating pressures.

Figure 23:
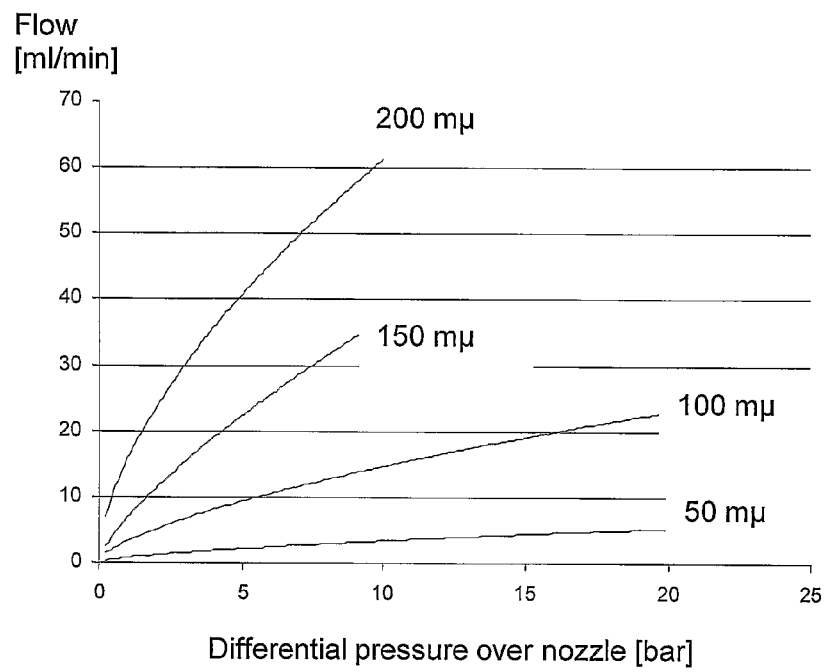
FIG. 23 is a graph showing the relation between flow rates and nozzle sizes of Example 3.

The flow ranges are summarised in the graph of FIG. 23. The graph shows flow rates for different nozzle sizes with a fully open valve. By using an operating valve, i.e. pulsed mode, the flow rate could be lowered down to less than 1% of these flows for each nozzle size.

Example 4

In Example 4 a disperser nozzle was tested in a multipurpose flow module. The nozzle was operated under a pulse mode. The nozzle size was chosen to give a sufficient flow rate at the pressure available. This means that the droplet size could be adjusted by changing the pump pressure at a constant flow rate.

Figure 24:
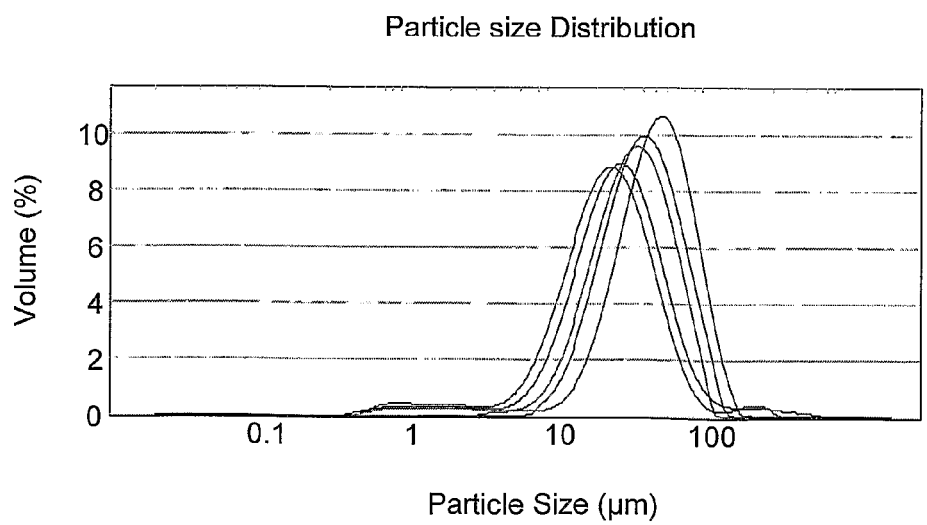
FIG. 24 is a graph showing the relation between liquid droplet size distribution and pressure of Example 4.

The nozzle was operating under different pressures and dodecane was injected in a solution of 0.2 wt % of surfactant in water. The injection pressures were 2, 4, 6, 8 and 10 Bar respectively. All tests were done at the same flow rate of 2 ml/min of dodecane, and the nozzle size was 150 microns. The duty cycle of the valve was set so that the flow rates were the same for all pressures. The droplet size distributions were evaluated, and the results are summarised in FIG. 24.

The conclusion is that the micro-disperser allows selection of different-desired droplet size, within a wide range, for a given nozzle size and flow rate. Since mass-transfer rates, in a chemical reaction, are strongly dependent on the interface surface area between the two media the ability to alter and decrease the droplet size diameter can be valuable in improving reaction yields or control.

Example 5

Residence Time Distributions (RTDs)

RTDs provide information on the axial macro mixing characteristics of a reactor. Interpretation of the RTD by use of a dispersion model enables an assessment to be made of the approximation to or deviation from plug flow. In this Example RTDs are measured by a stimulus-response technique. Optical probes are positioned at the inlet and outlet of the process side of one flow plate of the invention, and a pulse of dye is injected upstream of the inlet probe.

For every flow-rate selected in the range to be studied, the change in absorption with time is measured, typically resulting in hundreds or thousands of data points being collected over a few seconds or few minutes from each probe. These data may be block averaged. The RTD is then determined from the inlet and outlet responses by deconvoluting the following equation:

Outlet response=(Exit age distribution)×(Inlet response)

By fitting an axial dispersion model to the RTDs measured at the selected flow-rates, it is possible to calculate the Peclet number (Pe) for each flow-rate, which is defined by $$Pe = \frac{uL}{D_a}$$

where u is the average linear flow velocity, L is the length of the flow channel and $D_a$ is the axial dispersion coefficient. Provided the peak shape remains constant the axial dispersion coefficient is the rate of increase in peak width on passing through the flow channel. For ideal plug flow, Pe→∞ and for ideal back-mixed flow Pe→0. That means that from a practical technical view Pe>>1 for plug flow and Pe<<1 for full back-mixed flow.

Figure 25:
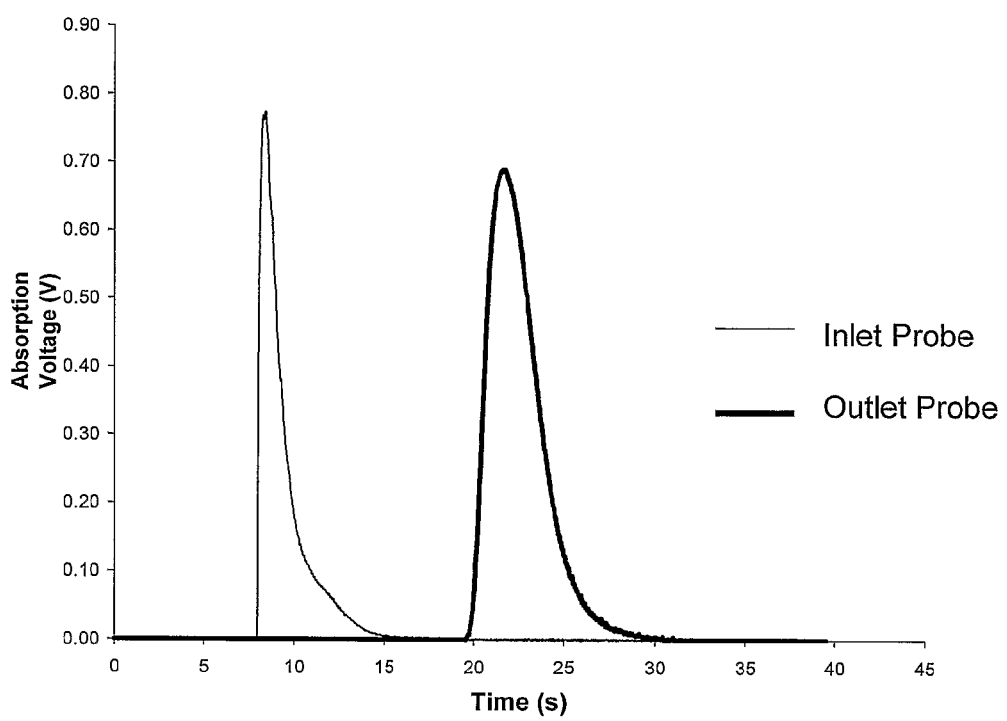
FIG. 25 is a graph showing the Residence Time Distributions (RTDs) of Example 5.

The conditions for one flow plate of the invention were:
Flow Rate=50 ml/min
Volume of Injected Dye=0.1 ml
Concentration of Injected Dye=5.1 g/L The results of the measurements are summarised FIG. 25, which shows the RTD collected for the one flow plate. The shapes of inlet and outlet peaks are similar, the Peclet number calculated from this data≈200, therefore the flow in the flow channel can be considered a plug flow.

What is claimed is:

1. A multipurpose flow module comprising, at least one of one or more externally connectible flow sections and one or more internally connectible flow sections, each flow section comprising at least one of one or more flow plates, one or more barrier plates, one or more cover plates, one or more pressure plates, or end plates, wherein each of the flow plates has a flow channel, which flow channel has at least one inlet and at least one outlet at each end of the flow channel, one or more connection ports being arranged between the outer sides of the flow plate and the flow channel, and the flow channel has one or more mixing zones in the form of bends or curved zones, wherein the barrier plates are made of at least one of a heat conducting material and an insulating material.

2. The multipurpose flow module according to claim 1, wherein the connection ports are equipped with security devices for at least one of instant and controlled pressure release.

3. The multipurpose flow module according to claim 1, wherein the mixing zones are in the form of corners at the bends or the curved zones of the flow channel.

4. The multipurpose flow module according to claim 1, wherein the flow channel is constructed or designed to create a plug flow.

5. The multipurpose flow module according to claim 1, wherein the flow channel has protruded zones arranged at one of next to each rim of the flow channel, along the circumference of the flow channel on one side of the flow plate, or on both sides of the flow plate.

6. The multipurpose flow module according to claim 1, wherein a pressure plate is placed to cover the flow channel on the other side of a gasket.

7. The multipurpose flow module according to claim 6, wherein the gasket has imprints or compressed areas corresponding to the flow channel.

8. The multipurpose flow module according to claim 1, wherein the multipurpose flow module comprises one or more flow sections and one or more heat exchanger sections.

9. The multipurpose flow module according to claim 8, wherein the heat exchanger sections comprise heat exchanger plates having at least one of cut through areas, cut through channels, channels, grooves, and depressions corresponding to the area of the flow channel of the flow plate.

10. The multipurpose flow module according to claim 8, wherein the heat exchanger plates have at least one of the cut through areas or the cut through channels having inserted structured package material, the cut through area or the cut through channels having wings, fins, or combinations of inserted structured package material and of cut through area or cut through channels having wings, fins.

11. The multipurpose flow module according to claim 8, wherein the heat exchanger section is a non-fluid heat transfer member, or a Peltier element.

12. The multipurpose flow module according to claim 8, wherein the flow sections, the heat exchanger sections are stacked at least one of horizontally and vertically.

13. The multipurpose flow module according to claim 1, wherein the one or more barrier plates are at least one of brazed, and welded, on one substantially flat side or both substantially flat sides of at least one flow plate, on one substantially flat side or both substantially flat sides of at least one heat exchanger plate, or being brazed, welded, or both on combinations of flow plates and heat exchanger plates.

14. The multipurpose flow module according to claim 1, wherein the connection ports are inlets for reactants, inlets for additional fluids, outlets for process fluids, outlets for intermediate products to be fed into the flow channel at a later stage, outlets for test samples, injection ports, inlet dispersers, being equipped with security devices for pressure release instant or controlled, being equipped with sensor units, being equipped with thermo elements, being plugged, or combinations thereof.

15. The multipurpose flow module according to claim 1, wherein at least one of the connection ports or at least one of the inlet ports is inserted with an inlet disperser having one or more holes at the outlet of the disperser.

16. The multipurpose flow module according to claim 15, wherein the holes are in concentric circles at the outlet of the disperser.

17. The multipurpose flow module according to claim 1, wherein at least one barrier plate or at least one gasket being a membrane.

18. The multipurpose flow module according to claim 1, wherein a degassing device is arranged at an outlet of at least one flow plate.

19. A multipurpose flow module comprising:
one or more flow sections and one or more heat exchanger sections, the flow sections being externally or internally connectible, each flow section comprising one or more flow plates and at least one of one or more barrier plates, one or more cover plates, one or more pressure plates, and end plates, wherein each of the flow plates has a flow channel, which flow channel has at least one inlet and at least one outlet at each end of the flow channel, one or more connection ports being arranged between the outer sides of the flow plate and the flow channel, and the flow channel has one or more mixing zones in the form of bends or curved zones, wherein a gasket closes or seals the flow plate against at least one of one or more plates, one or more barrier plates, one or more cover plates, one or more extra flow plates, one or more heat exchanger plates.

20. The multipurpose flow module according to claim 19, wherein the barrier plates are made of at least one of a heat conducting material and an insulating material.

21. The multipurpose flow module according to claim 19, wherein the heat exchanger plate has a cut through area, cut through channels, channels, grooves, or depressions being inserted into an inlet tube, an outlet tube, or both, on opposite sides of the heat exchanger plate.

22. The multipurpose flow module according to claim 21, wherein the inlet tube, the outlet tube or both have inserted sensors, inserted thermo elements, or both.

23. The multipurpose flow module according to claim 19, wherein the connection ports are inlets for reactants, inlets for additional fluids, outlets for process fluids, outlets for intermediate products to be fed into the flow channel at a later stage, outlets for test samples, injection ports, inlet dispersers, being equipped with security devices for pressure release instant or controlled, being equipped with sensor units, being equipped with thermo elements, being plugged, or combinations thereof.

24. The multipurpose flow module according to claim 19, wherein at least one of the connection ports or at least one of the inlet ports is inserted with an inlet disperser having one or more holes at the outlet of the disperser.

25. The multipurpose flow module according to claim 24, wherein the holes are in concentric circles at the outlet of the disperser.

26. The multipurpose flow module according to claim 19, wherein a degassing device is arranged at an outlet of at least one flow plate.

27. A multipurpose flow module comprising at least one flow section comprising a flow plate part and heat-exchanger plate part manufactured as one piece, having a flow channel with one inlet and one outlet, one or more connection ports being arranged along at least one outer side of the flow section communicating with the flow channel, a gasket and a plate for sealing the flow channel, an inserted element and a plate for sealing the heat exchanger plate part, and the flow channel is having one or more mixing zones in the form of bends or curved zones.

28. The multipurpose flow module according to claim 27, wherein the mixing zones being in form of corners at the bends or the curved zones of the flow channel.

29. The multipurpose flow module according to claim 27, wherein the plates are one or more barrier plates, cover plates, pressure plates, end plates, insulation plates or combinations thereof.

30. The multipurpose flow module according to claim 27, wherein the connection ports are inlets for reactants, inlets for additional fluids, outlets for process fluids, outlets for intermediate products to be fed into the flow channel at a later stage, outlets for test samples, injection ports, inlet dispersers, being equipped with security devices for pressure release instant or controlled, being equipped with sensor units, being equipped with thermo elements, being plugged, or combinations thereof.

31. The multipurpose flow module according to claim 27, wherein at least one of the connection ports or at least one of the inlet ports is inserted with an inlet disperser having one or more holes at the outlet of the disperser.

32. A method for at least one of extraction, reaction, separation, and mixing, in a multipurpose flow module, comprising introducing a first flow of materials through one or more inlet means into a flow channel, transferring the first flow of materials through the flow channel, optionally introducing one or more additional materials into the first flow of materials through one or more additional connection ports, regulating flow of materials, flow rates, residence time or combinations thereof, by aid of inlet dispersers, inlet valves, outlet valves, or combinations thereof, which inlet dispersers, inlet valves, outlet valves, or combinations thereof operate in pulse-mode or continuously and are controlled by modulated signals from one or more sensor units, and regulating temperatures by aid of one or more thermo elements, and controlling heat transfer from one or more heat exchanger plates;
wherein the flow of materials in the flow channel is regulated to create a plug flow of materials through the multipurpose flow module.

33. The method according to claim 32, wherein the method also comprises creating a plug flow of materials by aid of mixing zones.

34. The method according to claim 32, wherein the flow of materials in the flow channel being identified by aid of IR spectrometers, UV spectrometers, mass spectrometers, gas chromatography, or combinations thereof, connected to the connection ports.

35. The method according to claim 32, wherein the one or more sensor units, IR spectrometers, UV spectrometers, mass spectrometers, gas chromatography, or combinations thereof are sending signals to a computer or data processing unit, and which computer or data processing unit being programmed to process incoming information and to send signals for controlling flow, regulating units, temperature regulating units, or combinations thereof.

36. A method for at least one of extraction, reaction, separation, and mixing, in a multipurpose flow module, comprising introducing a first flow of materials through one or more inlet means into a flow channel, transferring the first flow materials through the flow channel, optionally introducing one or more additional materials into the first flow materials through one or more additional connection ports, creating a plug flow of materials in the flow channel;
wherein the flow of materials in the flow channel is regulated to create a plug flow of materials through the multipurpose flow module.

37. The method according to claim 36, wherein the method also comprises creating a plug flow of materials by aid of mixing zones.

38. The method according to claim 36, wherein the flow of materials in the flow channel being identified by aid of IR spectrometers, UV spectrometers, mass spectrometers, gas chromatography, or combinations thereof, connected to the connection ports.

39. The method according to claim 36, wherein the one or more sensor units, IR spectrometers, UV spectrometers, mass spectrometers, gas chromatography, or combinations thereof are sending signals to a computer or data processing unit, and which computer or data processing unit being programmed to process incoming information and to send signals for controlling flow, regulating units, temperature regulating units, or combinations thereof.

40. A multipurpose flow module comprising, at least one of one or more externally connectible flow sections and one or more internally connectible flow sections, each flow section comprising at least one of one or more flow plates, one or more barrier plates, one or more cover plates, one or more pressure plates, and end plates, wherein each of the flow plates has a flow channel, which flow channel has at least one inlet and at least one outlet at each end of the flow channel, one or more connection ports being arranged between the outer sides of the flow plate and the flow channel, and the flow channel has one or more mixing zones in the form of bends or curved zones, wherein at least one flow section comprising a flow plate part and heat-exchanger plate part manufactured as one piece.

* * * * *